United States Patent
Jovicic et al.

(10) Patent No.: US 9,317,747 B2
(45) Date of Patent: Apr. 19, 2016

(54) DETERMINING AN ORIENTATION OF A MOBILE DEVICE

(71) Applicant: QUALCOMM Incorporated, San Diego, CA (US)

(72) Inventors: Aleksandar Jovicic, Jersey City, NJ (US); Snehesh Shrestha, Danbury, CT (US); Kumar Appaiah, Piscataway, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 14/271,202

(22) Filed: May 6, 2014

(65) Prior Publication Data

US 2015/0324642 A1 Nov. 12, 2015

(51) Int. Cl.
*G06K 9/00* (2006.01)
*G01S 5/16* (2006.01)
*G06T 7/00* (2006.01)

(52) U.S. Cl.
CPC ............. *G06K 9/00624* (2013.01); *G01S 5/163* (2013.01); *G06T 7/004* (2013.01); *G06T 7/0042* (2013.01)

(58) Field of Classification Search
None
See application file for complete search history.

(56) References Cited

U.S. PATENT DOCUMENTS

| | | | |
|---|---|---|---|
| 4,933,864 A | 6/1990 | Evans, Jr. et al. | |
| 5,155,684 A | 10/1992 | Burke et al. | |
| 6,459,955 B1 | 10/2002 | Bartsch et al. | |
| 7,605,702 B2 * | 10/2009 | Uchimura | G01S 5/16 235/385 |
| 7,996,097 B2 | 8/2011 | DiBernardo et al. | |
| 8,248,467 B1 * | 8/2012 | Ganick et al. | 348/116 |
| 8,381,982 B2 * | 2/2013 | Kunzig et al. | 235/462.08 |
| 8,752,761 B2 * | 6/2014 | Calvaresse et al. | 235/439 |
| 8,923,622 B2 | 12/2014 | O'Haire et al. | |
| 2005/0213109 A1 | 9/2005 | Schell et al. | |
| 2010/0225484 A1 * | 9/2010 | Van De Sluis | G01S 5/16 340/572.4 |
| 2013/0065482 A1 | 3/2013 | Trickett | |
| 2014/0265878 A1 * | 9/2014 | Gritti | H04B 10/116 315/153 |
| 2014/0375982 A1 * | 12/2014 | Jovicic et al. | 356/72 |
| 2015/0036016 A1 * | 2/2015 | Jovicic | 348/222.1 |

FOREIGN PATENT DOCUMENTS

| WO | WO-2014048475 A1 | 4/2014 |
|---|---|---|
| WO | WO-2015001444 A1 | 1/2015 |

OTHER PUBLICATIONS

Sertthin et al., "6-axis sensor assisted low complexity high accuracy-visible light communication based indoor positioning system", IEICE Trans, Commun., vol. E93-B, No. 11, Nov. 2010.*

(Continued)

*Primary Examiner* — Soo Park
(74) *Attorney, Agent, or Firm* — Holland & Hart LLP

(57) ABSTRACT

Methods, systems, and devices are described for determining an orientation of a mobile device. One method includes capturing, at the mobile device, an image of at least one illuminated object defining an illuminated reference axis; determining a first angle between the illuminated reference axis and a device reference axis of the mobile device; determining a second angle between the illuminated reference axis and a common reference axis; estimating a third angle between the device reference axis and the common reference axis; and determining an orientation of the mobile device based at least in part on the first angle, the second angle, and the third angle.

30 Claims, 15 Drawing Sheets

(56) References Cited

OTHER PUBLICATIONS

Liu et al., "Basic study on indoor location estimation using visible light communicaiton platform", 30th Annual International IEEE EMBS Conference, Aug. 20-24, 2008.*

Lee et al., "Location awareness using angle-of-arrival based circular-pd-array for visible light communication", APCC 2012.*

Nakajima et al., "New indoor navigation system for visually impaired people using visible light communication", EURASIP Journal on Wireless Communications and Networking, Dec. 2013.*

ISA/EPO, International Search Report and Written Opinion of the International Searching Authority, Int'l Appl. No. PCT/US2015/024435, Jul. 7, 2015, European Patent Office, Rijswijk, NL, 13 pgs.

* cited by examiner

DETERMINING AN ORIENTATION OF A MOBILE DEVICE

BACKGROUND

The following relates generally to techniques for determining the orientation of a mobile device, particularly in an X-Y plane (e.g., parallel to the earth's surface). Many mobile devices (e.g., cellular devices, computers, vehicles, robotic machines, etc.) include a compass for determining the mobile device's orientation in an X-Y plane. However, when a mobile device is used, for example, in an indoor environment, magnetic influences from large metal structures, such as metal structures inside walls, floors, and/or furniture, can interfere with the compass' ability to accurately measure the earth's magnetic flux. Although a mobile device's compass may provide an approximately correct orientation of the mobile device in an indoor environment, a more accurate orientation may be needed for some navigation purposes (e.g., for directing a user of the mobile device to an object and/or location in a store; for directing a user of the mobile device to targeted advertising; for steering a robotic machine; etc.).

SUMMARY

The described features generally relate to one or more improved methods, systems, and/or devices for determining an orientation of a mobile device. In some examples, the methods, systems, and/or devices use an image of illuminated objects captured by a mobile device, such as an image of one or more overhead light fixtures, coupled with information pertaining to the orientation(s) of the at least one illuminated object and an approximate orientation of the mobile device acquired using a compass of the mobile device, to determine a more accurate orientation of the mobile device.

In a first set of illustrative examples, a method for determining an orientation of a mobile device is described. In one configuration, the method may include capturing, at the mobile device, an image of at least one illuminated object defining an illuminated reference axis; determining a first angle between the illuminated reference axis and a device reference axis of the mobile device; determining a second angle between the illuminated reference axis and a common reference axis; estimating a third angle between the device reference axis and the common reference axis; and determining an orientation of the mobile device based at least in part on the first angle, the second angle, and the third angle.

In some embodiments, capturing the image of the at least one illuminated object may include capturing an image of at least part of at least one overhead light fixture. In these embodiments, the illuminated reference axis may include an edge of one of the at least one overhead light fixture.

In some configurations, the method may include receiving a visible light communication (VLC) signal including an identifier of an illuminated object in the image. In these configurations, determining the second angle may include obtaining the second angle from electronically stored information based at least in part on the identifier of the illuminated object.

In some examples, the method may include determining, from the image of the at least one illuminated object, a visual identifier of an illuminated object in the image. In these examples, determining the second angle may include obtaining the second angle from electronically stored information based at least in part on the visual identifier of the illuminated object.

In some configurations, the method may include determining a venue in which the mobile device is located. In these configurations, determining the second angle may include obtaining the second angle from electronically stored information based at least in part on the venue in which the mobile device is located.

In some examples, the method may include identifying an edge of one of the at least one illuminated object. The edge may include the illuminated reference axis. The method may further include determining a relative length of the edge. In these examples, determining the second angle may include determining the second angle based at least in part on the relative length of the edge.

In some embodiments of the method, determining the second angle may include obtaining the second angle from electronically stored information. In some cases, obtaining the second angle from the electronically stored information may include accessing the electronically stored information over a network.

In some examples of the method, the common reference axis may correspond to a compass heading. In these examples, the method may include acquiring a compass reading of the mobile device; and estimating the third angle may include estimating the third angle based at least in part on the compass reading. In some cases, the compass heading may be magnetic north.

In some embodiments of the method, determining the orientation of the mobile device may include determining, from at least the first angle and the second angle, a set of at least two possible orientations of the mobile device, and selecting the orientation of the mobile device, from the set of at least two possible orientations of the mobile device, based at least in part on the third angle.

In some examples of the method, the illuminated reference axis may include an illuminated edge of a polygonal light fixture, a line segment defined by a light rope, and/or a line segment defined by at least two illuminated points.

In a second set of illustrative examples, an apparatus for determining an orientation of a mobile device is described. In one configuration, the apparatus may include means for capturing, at the mobile device, an image of at least one illuminated object defining an illuminated reference axis; means for determining a first angle between the illuminated reference axis and a device reference axis of the mobile device; means for determining a second angle between the illuminated reference axis and a common reference axis; means for estimating a third angle between the device reference axis and the common reference axis; and means for determining the orientation of the mobile device based at least in part on the first angle, the second angle, and the third angle.

In a third set of illustrative examples, another apparatus for determining an orientation of a mobile device is described. In one configuration, the apparatus may include a processor, memory in electronic communication with the processor, and instructions stored in the memory. The instructions may be executable by the processor to capture, at a mobile device, an image of at least one illuminated object defining an illuminated reference axis; determine a first angle between the illuminated reference axis and a device reference axis of the mobile device; determine a second angle between the illuminated reference axis and a common reference axis; estimate a third angle between the device reference axis and the common reference axis; and determine the orientation of the mobile device based at least in part on the first angle, the second angle, and the third angle.

In a fourth set of illustrative examples, a computer program product for determining an orientation of a mobile device is described. In one configuration, the computer program product may include a non-transitory computer-readable medium storing instructions executable by a processor to cause the mobile device to capture, at a mobile device, an image of at least one illuminated object defining an illuminated reference axis; determine a first angle between the illuminated reference axis and a device reference axis of the mobile device; determine a second angle between the illuminated reference axis and a common reference axis; estimate a third angle between the device reference axis and the common reference axis; and determine the orientation of the mobile device based at least in part on the first angle, the second angle, and the third angle.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The determination of an orientation of a mobile device (e.g., an orientation in an X-Y plane parallel to the earth's surface) is described. In some examples, an orientation of a mobile device may be determined using an image of illuminated objects captured by a mobile device, such as an image of one or more overhead light fixtures, coupled with information pertaining to the orientation(s) of the at least one illuminated object and an approximate orientation of the mobile device acquired using a compass of the mobile device, to determine a more accurate orientation of the mobile device.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
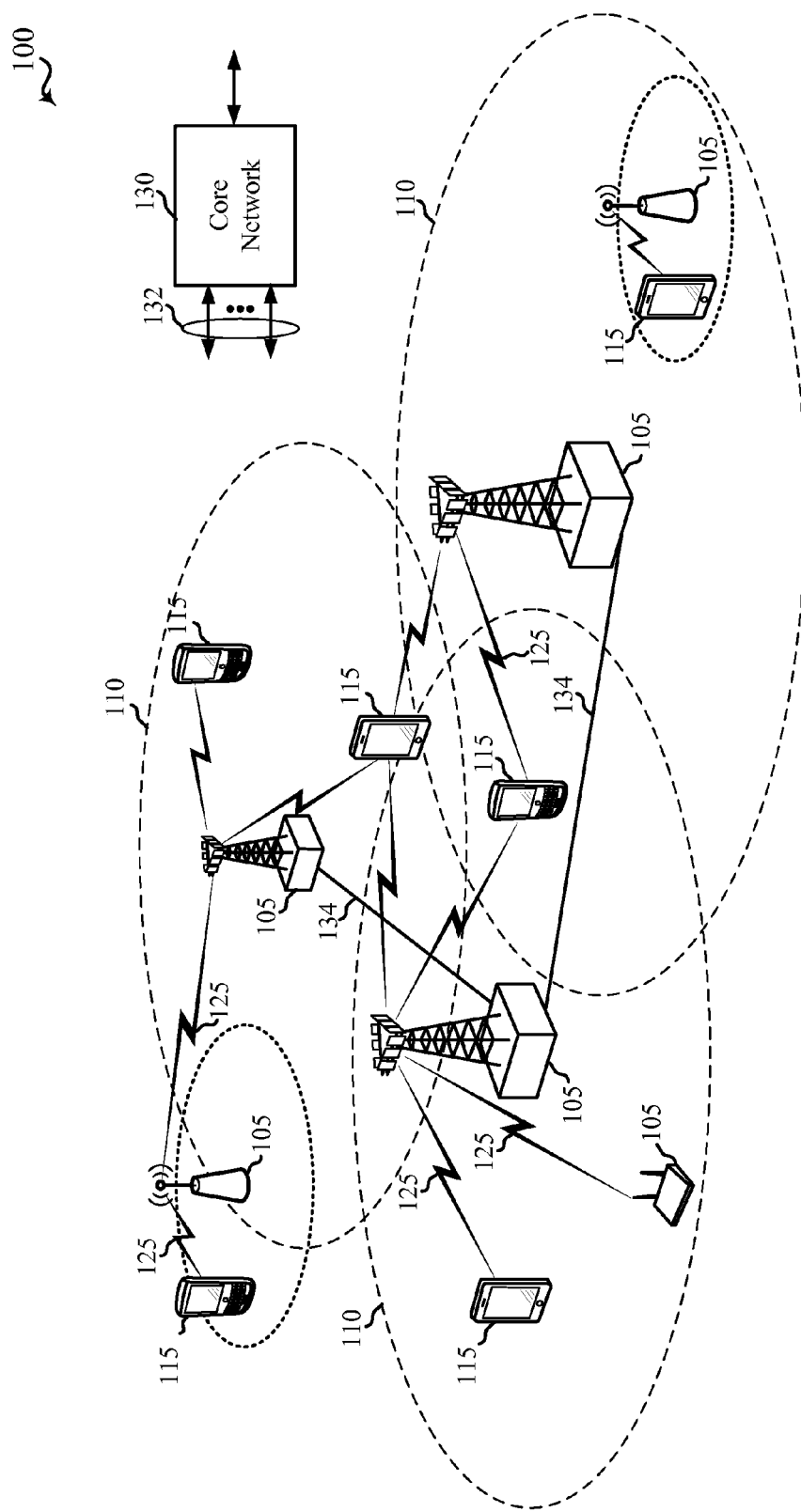
FIG. 1 is a diagram illustrating an example of a wireless communication system.

Referring first to FIG. 1, a diagram illustrating an example of a wireless communication system 100 is provided. The wireless communication system 100 may include a plurality of access points 105 (e.g., base stations, eNBs, or Wi-Fi access points), a number of mobile devices 115, and a core network 130. Some of the access points 105 may communicate with the mobile devices 115 under the control of a base station controller (not shown), which may be part of the core network 130 or certain access points 105 (e.g., base stations or eNBs) in various embodiments. Some of the access points 105 may communicate control information and/or user data with the core network 130 through backhaul 132. In some embodiments, some of the access points 105 may communicate, either directly or indirectly, with each other over backhaul links 134, which may be wired or wireless communication links. The wireless communication system 100 may support operation on multiple carriers (e.g., waveform signals of different frequencies). Multi-carrier transmitters may transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the mobile devices 115 via one or more access point antennas. Each of the access points 105 may provide communication coverage for a respective coverage area 110. In some embodiments, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, or some other suitable terminology. The coverage area 110 for an access point 105 may be divided into sectors making up only a portion of the coverage area (not shown). The wireless communication system 100 may include access points 105 of different types (e.g., macro, micro, and/or pico base stations). The access points 105 may also utilize different radio technologies and/or may be associated with the same or different access networks. The coverage areas of different access points 105, including the coverage areas of the same or different types of access points 105, utilizing the same or different radio technologies, and/or belonging to the same or different access networks, may overlap.

In some embodiments, the wireless communication system 100 may include an LTE/LTE-A communication system (or network). In LTE/LTE-A communication systems, the term evolved Node B (eNB) may be generally used to describe one of the access points 105 and the term user equipment (UE) may be generally used to describe one of the mobile devices 115. The wireless communication system 100 may also be a Heterogeneous LTE/LTE-A network, in which different types of eNBs provide coverage for various geographical regions. For example, each eNB may provide communication coverage for a macro cell, a pico cell, a femto cell, and/or other types of cell. A macro cell may generally cover a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the access points 105 via a backhaul 132 (e.g., S1, etc.). When configured as eNBs, for example, the access points 105 may also communicate with one another, e.g., directly or indirectly via backhaul links 134 (e.g., X2, etc.) and/or via backhaul 132 (e.g., through core network 130). The wireless communication system 100 may support synchronous or asynchronous operation. For synchronous operation, eNBs may have similar frame timing, and transmissions from different eNBs may be approximately aligned in time. For asynchronous operation, the eNBs may have different frame timing, and transmissions from different eNBs may not be aligned in time. The mobile devices 115 described herein may be used in either synchronous or asynchronous operations.

The mobile devices 115 may be dispersed throughout the wireless communication system 100. A mobile device 115 may also be referred to by those skilled in the art as a user equipment (UE), a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A mobile device 115 may, in some cases, be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. A mobile device 115 may be able to communicate with macro eNBs, pico eNBs, femto eNBs, relays, and the like. A mobile device 115 may also be able to communicate over different access networks, such as other cellular or WWAN networks, or WLAN access networks (e.g., Wi-Fi networks).

The communication links 125 shown in wireless communication system 100 may include uplinks for carrying uplink (UL) transmissions (e.g., from a mobile device 115 to an access point 105) and/or downlinks for carrying downlink (DL) transmissions (e.g., from an access point 105 to a mobile device 115). The UL transmissions may also be called reverse link transmissions, while the DL transmissions may also be called forward link transmissions.

In some cases, a mobile device 115 may include an image sensor capable of capturing an image, as described below, for example, with reference to FIG. 2. When a mobile device 115 needs to obtain electronically stored information for conducting the processing described with reference to FIG. 2, and/or when a mobile device 115 needs to offload some of the processing described with reference to FIG. 2, the mobile device 115 may obtain the electronically stored information and/or offload processing by communicating with one or more devices (e.g., an access point 105) of a wireless communication system such as the wireless communication system 100.

Figure 2:
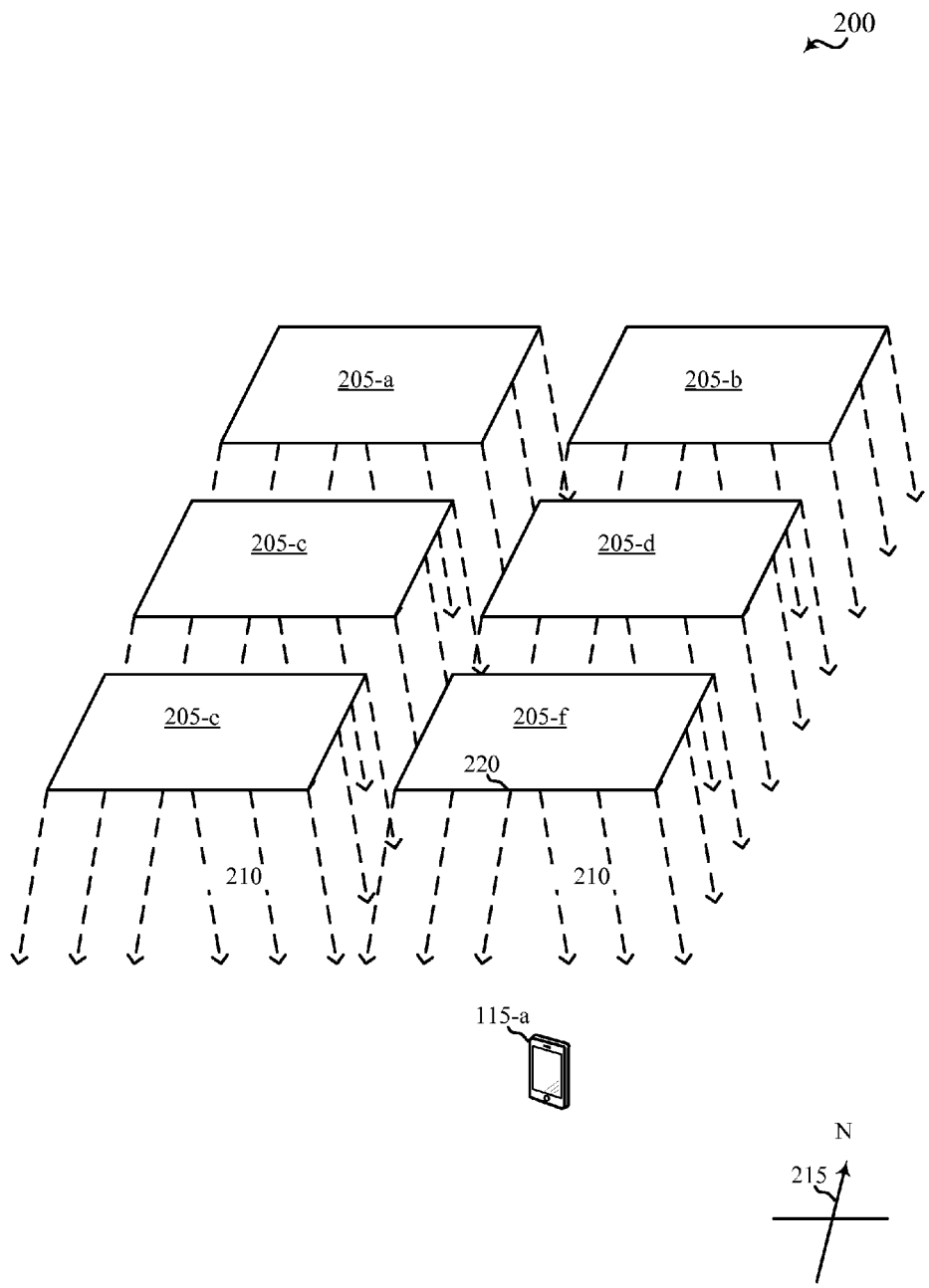
FIG. 2 is a diagram illustrating an example of a mobile device positioned below a number of square or rectangular light fixtures.

Referring now to FIG. 2, a diagram 200 illustrates an example of a mobile device 115-*a* positioned below a number of square or rectangular light fixtures 205-*a*, 205-*b*, 205-*c*, 205-*d*, 205-*e*, and 205-*f*. The mobile device 115-*a* may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. The mobile device 115-*a* may be an example of the mobile devices 115 illustrated in FIG. 1 The light fixtures 205-*a*, 205-*b*, 205-*c*, 205-*d*, 205-*e*, and 205-*f* may in some examples be overhead light fixtures in a building, which overhead light fixtures may have fixed orientations with respect to a common reference axis shared by the light fixtures 205-*a*, 205-*b*, 205-*c*, 205-*d*, 205-*e*, and 205-*f* and the mobile device 115-*a*. In some examples, the common reference axis may be a meridian passing through magnetic north 220.

In some examples, the mobile device 115-*a* may include an image sensor (e.g., a camera of the mobile device 115-*a*). As the mobile device 115-*a* moves (or is moved) under one or more of the light fixtures 205-*a*, 205-*b*, 205-*c*, 205-*d*, 205-*e*, and 205-*f*, the image sensor of the mobile device 115-*a* may capture an image of part or all of one or more of the light fixtures 205-*a*, 205-*b*, 205-*c*, 205-*d*, 205-*e*, and 205-*f*. The captured image may include an illuminated reference axis, such as the illuminated edge 220 of the light fixture 205-*f*.

Upon capturing an image including the illuminated reference axis, the mobile device 115-*a* may determine a first angle, between the illuminated reference axis and a device reference axis of the mobile device 115-*a*. The device reference axis may in some cases correspond to a side of the image sensor, a side of a screen of the mobile device 115-*a*, or a side of the mobile device 115-*a*. The mobile device 115-*a* may also determine a second angle, between the illuminated reference axis and the common reference axis. The mobile device 115-*a* may also estimate a third angle, between the device reference axis and the common reference axis. The third angle may be estimated, in some cases, by acquiring a compass reading of the mobile device 115-*a* (e.g., a reading captured using a compass on-board the mobile device 115-*a*), and estimating the third angle based at least in part on the compass reading.

Based at least in part on the first angle, the second angle, and the third angle, the mobile device 115-*a* may determine its orientation in an X-Y plane. For example, the mobile device 115-a may determine, from at least the first angle and the second angle, a set of at least two possible orientations of the mobile device 115-a. When the image captured by the image sensor of the mobile device 115-a includes an image of a rectangular light fixture and the illuminated reference axis includes an edge of the rectangular light fixture, the set of at least two possible orientations of the mobile device 115-a may include two possible orientations of the mobile device 115-a (assuming, that is, that the mobile device 115-a can determine whether the illuminated reference axis is a long edge or a short edge of the rectangular light fixture). When the image captured by the image sensor of the mobile device 115-a includes an image of a square light fixture and the illuminated reference axis includes an edge of the square light fixture, the set of at least two possible orientations of the mobile device 115-a may include four possible orientations of the mobile device 115-a. The mobile device 115-a may select its orientation, from the set of at least two possible orientations, based at least in part on the third angle. In this manner, the third angle (e.g., an angle based on a compass reading that may be somewhat imprecise because of the effects of magnetic influences inside a building or other structure) may be used to select a more precise orientation of the mobile device 115-a from a set of at least two possible orientations of the mobile device 115-a (wherein the at least two possible orientations are based at least in part on known orientations of the light fixtures 205-a, 205-b, 205-c, 205-d, 205-e, and 205-f). In some examples, some or all of the determinations indicated to be made by the mobile device 115-a may be made remote from the mobile device 115-a and communicated to the mobile device 115-a.

Upon determining the orientation of the mobile device 115-a, the orientation may be used for navigation. For example, one or more applications running on-board (or remote from) the mobile device 115-a may instruct a user of the mobile device 115-a on where to look and/or how to move to locate a location and/or object. By way of additional example, the one or more applications may also or alternately cause a control system to move the mobile device 115-a to the location and/or object.

Figure 3:
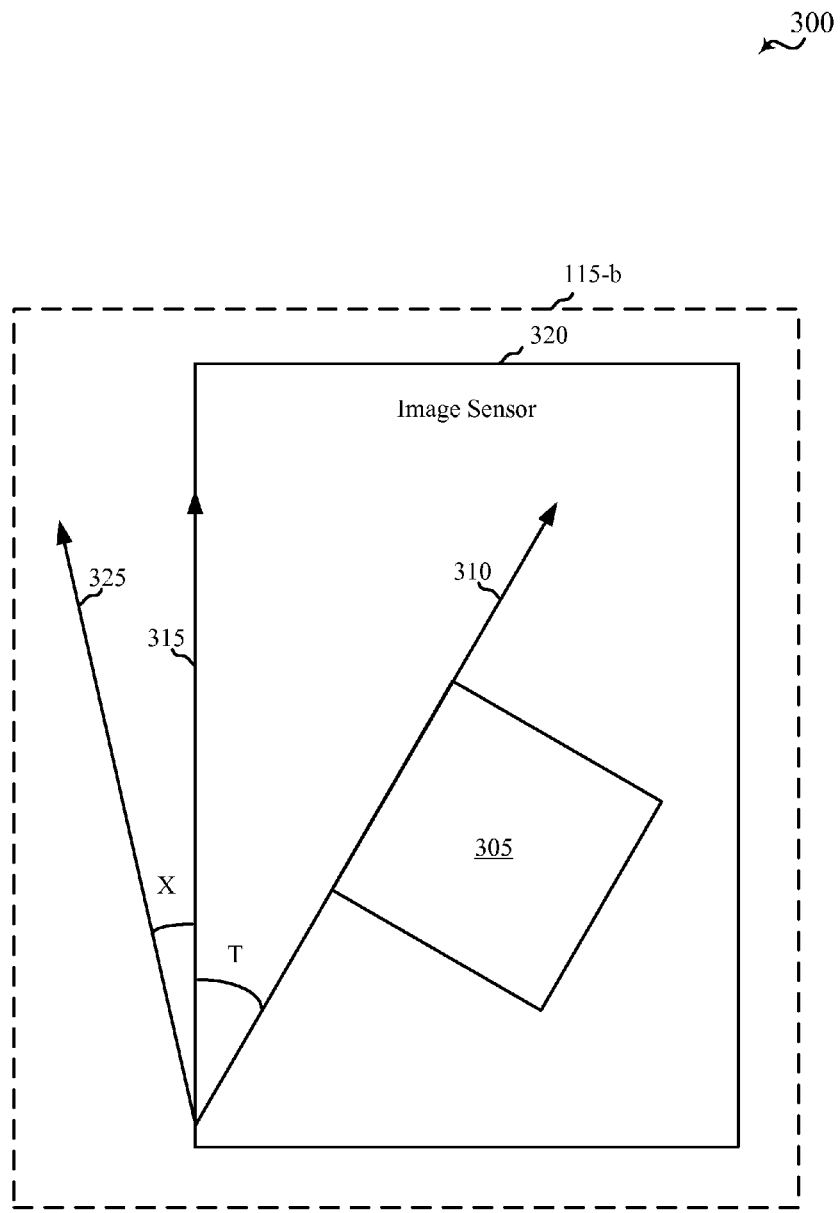
FIG. 3 illustrates an example of a mobile device capturing an image of at least one illuminated object defining an illuminated reference axis and determining a first angle, T, between the illuminated reference axis and a device reference axis of the mobile device.

FIG. 3 illustrates an example 300 of a mobile device 115-b capturing an image 305 of at least one illuminated object defining an illuminated reference axis 310 and determining a first angle, T, between the illuminated reference axis 310 and a device reference axis 315 of the mobile device 115-b. The image of the at least one illuminated object may in some cases be or include an image of a light fixture (e.g., one of the light fixtures 205-a, 205-b, 205-c, 205-d, 205-e, and/or 205-f described with reference to FIG. 2), a light bulb, a light rope, and/or other form of illuminated object having a detectable orientation. In some examples, the illuminated reference axis 310 may be or include an illuminated edge of a polygonal light fixture or light bulb, an illuminated edge of a light fixture or light bulb having an illuminated edge, a line segment defined by a light rope, and/or a line segment defined by at least two illuminated points. By way of example, the image 305 of at least one illuminated object is shown in FIG. 3 to be an image 305 of a square light fixture, and the illuminated reference axis 310 is shown to be an illuminated edge of the square light fixture.

In some examples, the image 305 of the at least one illuminated object may be captured using an image sensor 320 of the mobile device 115-b. The device reference axis 315 may in some cases correspond to a side of the image sensor 320. Alternately, the device reference axis may correspond to, for example, a side of a screen of the mobile device 115-b, or a side of the mobile device 115-b.

Figure 4:
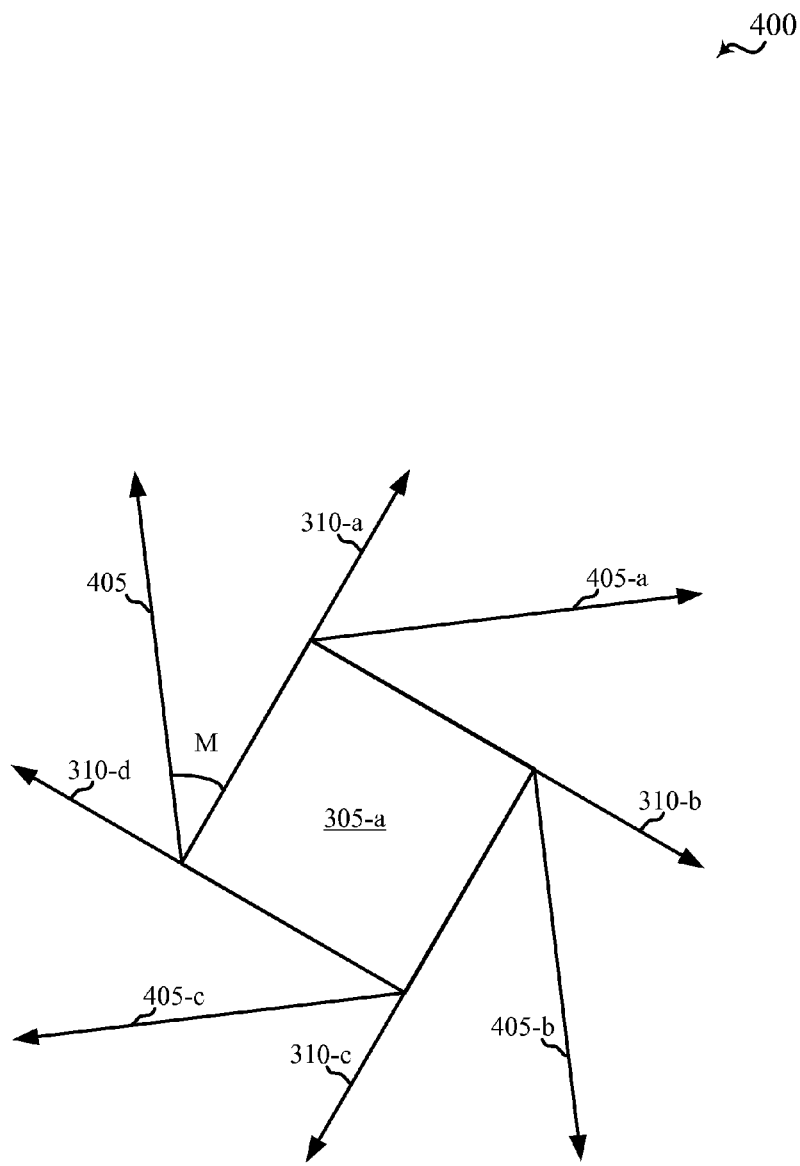
FIG. 4 illustrates an example of determining a second angle, M, between an illuminated reference axis of at least one illuminated object and a common reference axis (e.g., a meridian passing through magnetic north)

FIG. 4 illustrates an example 400 of determining a second angle, M, between an illuminated reference axis 310-a of at least one illuminated object 305-a and a common reference axis 405 (e.g., a meridian passing through magnetic north). The at least one illuminated object 305-a may, in some cases, be or include a light fixture (e.g., one of the light fixtures 205-a, 205-b, 205-c, 205-d, 205-e, and/or 205-f described with reference to FIG. 2), a light bulb, a light rope, and/or other form of illuminated object having a detectable orientation. In some examples, the illuminated reference axis 310-a may be or include an illuminated edge of a polygonal light fixture or light bulb, an illuminated edge of a light fixture or light bulb having an illuminated edge, a line segment defined by a light rope, and/or a line segment defined by at least two illuminated points. By way of example, the at least one illuminated object 305-a is shown in FIG. 4 to be a square light fixture, and the illuminated reference axis 310-a is shown to be an illuminated edge of the square light fixture.

In some examples, determining the second angle, M, may include obtaining the second angle from electronically stored information (e.g., an electronically stored map and/or database). In some examples, the electronically stored information may correspond to a building or other venue, and may be downloaded (e.g., manually downloaded or automatically downloaded) to a mobile device 115 that is determining its orientation upon the mobile device 115 entering or nearing the venue. In some examples, the at least one illuminated object 305-a may transmit a visible light communications (VLC) signal including an identifier, and the identifier may be used to obtain the second angle from the electronically stored information. In other examples, a separate VLC transmitter associated with the at least one illuminated object 305-a may transmit the VLC signal. In other examples, a visual identifier may be associated with the at least one illuminated object 305-a and may be illuminated and/or defined by the at least one illuminated object 305-a. The visual identifier may be decoded by a mobile device 115 and used by the mobile device 115 to obtain the second angle from the electronically stored information. In other examples, all of the light fixtures within a building or other venue may have the same configuration and be oriented the same way. In these latter examples, a mobile device 115 may obtain the second angle from the electronically stored information using its venue.

As described with reference to FIG. 3, a mobile device 115 may capture an image of the at least one illuminated object 305-a. The image may include an image of the illuminated reference axis 310-a. However, when the orientation of the at least one illuminated object 305-a with reference to a mobile device 115 is unknown, there may be ambiguity regarding which of a number of illuminated reference axes (e.g., illuminated reference axis 310-a, 310-b, 310-c, or 310-d) the mobile device 115 captured, and ambiguity regarding the illuminated reference axis 310-a, 310-b, 310-c, or 310-d to which the second angle, M, applies. In the context of a square light fixture, as shown in FIG. 4, there are four illuminated reference axes to which the second angle, M, may apply (e.g., the second angle, M, may be an angle between the illuminated reference axis 310-a and the common reference axis 405, an angle between the illuminated reference axis 310-b and the common reference axis 405-a, an angle between the illuminated reference axis 310-c and the common reference axis 405-b, or an angle between the illuminated reference axis 310-d and the common reference axis 405-c. In the context of a rectangular light fixture, and assuming that a mobile device 115 can determine whether an illuminated reference axis corresponds to the long edge or the short edge of the rectangular light fixture (and the second angle may be indexed based on its correspondence to the long edge or the short edge), there are two illuminated reference axes to which the second angle may apply.

Consider a scenario where the mobile device 115-b described with reference to FIG. 3 determines that the first angle, T, is 30 degrees and determines that the second angle, M, is 45 degrees. Also assume that the at least one illuminated object 305-a is a square light fixture. In such a scenario, the orientation of the mobile device 115-b, in degrees relative to the common reference axis 405, may be one of the following quantities: {M−5, M−T+90, M−T+180, or M−T+270}={45−30, 45−30+90, 45−30+180, or 45−30+270}={15, 105, 195, or 285}. If the common reference axis 405 defines magnetic north, then the angles {0, 90, 180, and 270} respectively define North, East, South, and West.

Figure 5:
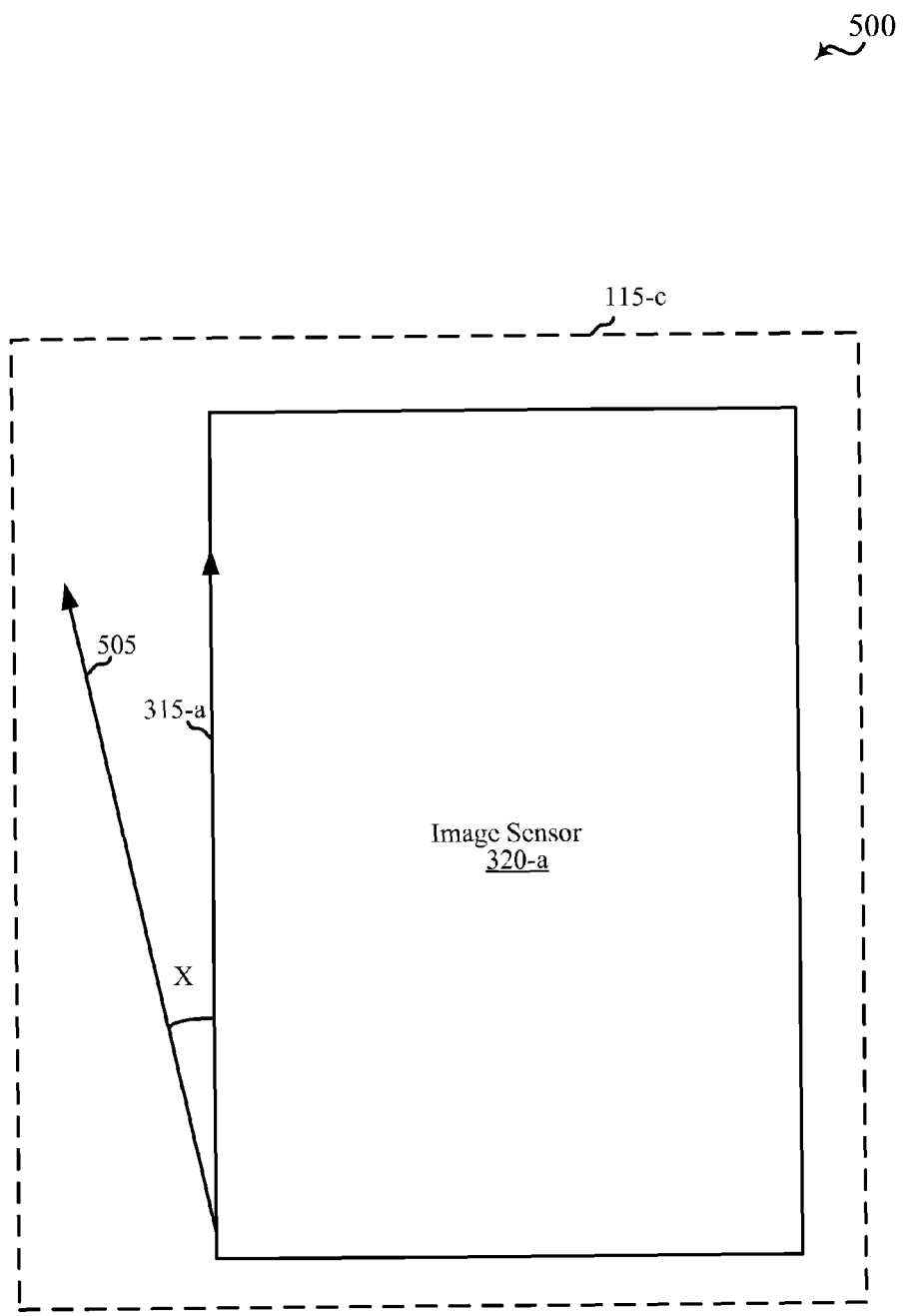
FIG. 5 illustrates an example of estimating a third angle, X, between a device reference axis of a mobile device and a common reference axis (e.g., a meridian passing through magnetic north)

FIG. 5 illustrates an example of estimating a third angle, X, between a device reference axis 315-a of a mobile device 115-c and a common reference axis 505 (e.g., a meridian passing through magnetic north). In some examples, the determination of the third angle may be based at least in part on a compass reading acquired by a compass of the mobile device 115-c. The estimation of the third angle may in some cases be somewhat imprecise, because, for example, of the effects of magnetic influences inside a building or other structure.

In some examples, the device reference axis 315-a may correspond to a side of an image sensor 320-a of the mobile device 115-c. Alternately, the device reference axis may correspond to, for example, a side of a screen of the mobile device 115-c, or a side of the mobile device 115-c.

Consider again the scenario described with reference to FIG. 4, in which the orientation of the mobile device 115-b is determined to be one of 15, 105, 195, or 285 degrees with reference to the common reference axis 405. If the set, S, of four possible orientations {15, 105, 195, or 285}={A_1, A_2, A_3, or A_4}, and the third angle, X, is somewhat close to one of the four possible orientations, then the orientation, O, of the mobile device 115-b may be determined as O=argmin_S|X−A_i|, where argmin_S is the minimum of the values in the set of S. Stated differently, the orientation, O, of the mobile device 115-b is the value in the set of S that is closes to the third angle, X. If the mobile device 115-c determines X=20 degrees, then the orientation, O, of the mobile device 115-b is 15 degrees with reference to the common reference axis 405.

Figure 6:
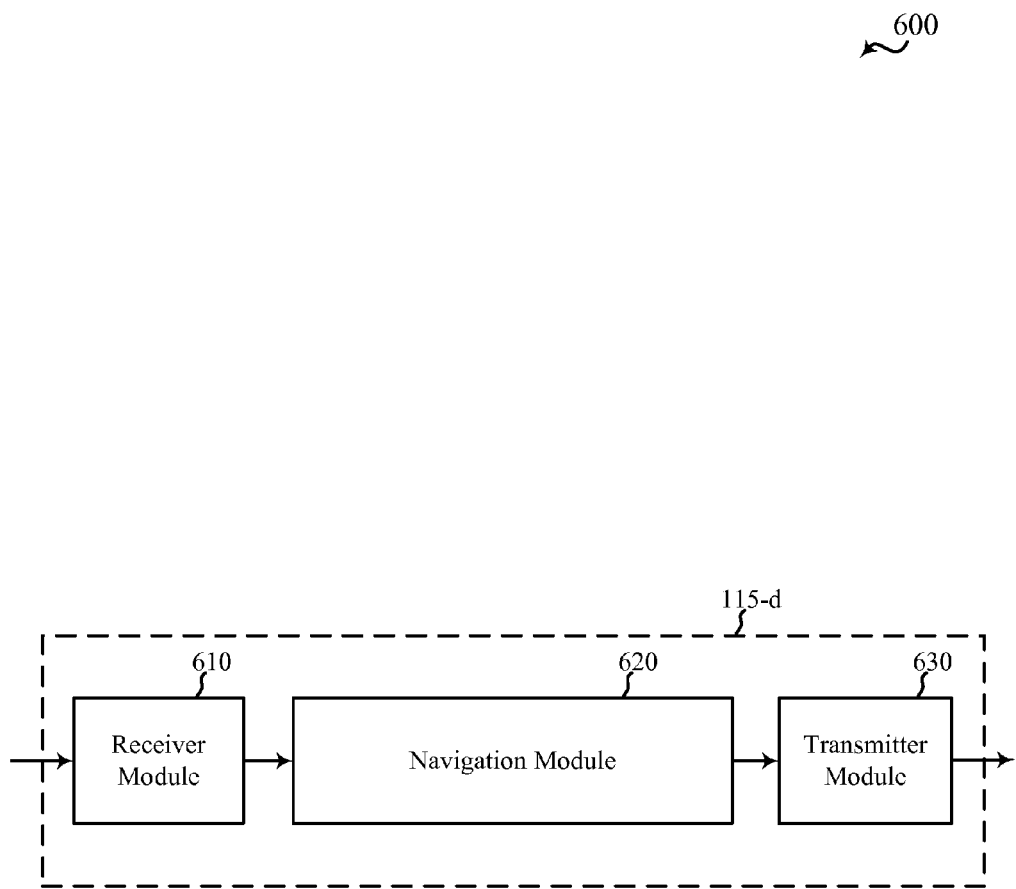
FIG. 6 is a block diagram illustrating an example of a mobile device capable of determining its orientation.

Referring now to FIG. 6, a block diagram 600 illustrates an example of a mobile device 115-d capable of determining its orientation. The mobile device 115-d may be an example of one or more aspects of one of the mobile devices 115 described with reference to FIGS. 1, 2, 3, and/or 5. The mobile device 115-d may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. The mobile device 115-d may include a receiver module 610, a navigation module 620, and/or a transmitter module 630. Each of these components may be in communication with each other.

The components of the apparatus 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 610 may include an image sensor (e.g., an image sensor of a camera). The image sensor may be used to receive an image of at least one illuminated object, such as an image of a light fixture, a light bulb, a light rope, and/or other form of illuminated object. The image sensor may also be used to receive one or more VLC signals (e.g., a VLC signal received from an illuminated object acting as a VLC transmitter and/or a VLC transmitter associated with an illuminated object (e.g., an LED)). In some examples, the receiver module 610 may also or alternately include a VLC receiver (e.g., a photodiode) that is separate from the image sensor. The receiver module 610 may also include a radio frequency (RF) receiver, such as a wireless wide area network (WWAN) receiver (e.g., a cellular receiver and/or LTE/LTE-A receiver), a wireless local area network (WLAN) receiver (e.g., a Wi-Fi receiver), a Bluetooth (BT) receiver, and/or a BT Low Energy (BTLE) receiver. The RF receiver may be used to receive various types of data and/or control signals (i.e., transmissions) over one or more RF communication channels of a wireless communication system such as the wireless communication system 100 described with reference to FIG. 1.

In some examples, the transmitter module 630 may include an RF transmitter, such as a WWAN transmitter (e.g., a cellular transmitter and/or LTE/LTE-A transmitter), a WLAN transmitter, (e.g., Wi-Fi transmitter), a BT transmitter, and/or a BTLE transmitter. The RF transmitter may be used to transmit various types of data and/or control signals (i.e., transmissions) over one or more RF communication channels of a wireless communication system such as the wireless communication system 100 described with reference to FIG. 1.

In some cases, the RF receiver(s) of the receiver module 610 and the RF transmitter(s) of the transmitter module 630 may be provided by a WWAN radio (e.g., a cellular radio and/or LTE/LTE-A radio) and/or a WLAN radio (e.g., a Wi-Fi radio).

The navigation module 620 may perform various functions. In some examples, the navigation module 220 may be used to determine the location and/or orientation of the mobile device 115-d. In some examples, the navigation module 620 may instruct a user on where to look and/or how to move to locate a location and/or object. In some examples, the navigation module 620 may cause a control system to move the mobile device 115-d to a location and/or object.

Figure 7:
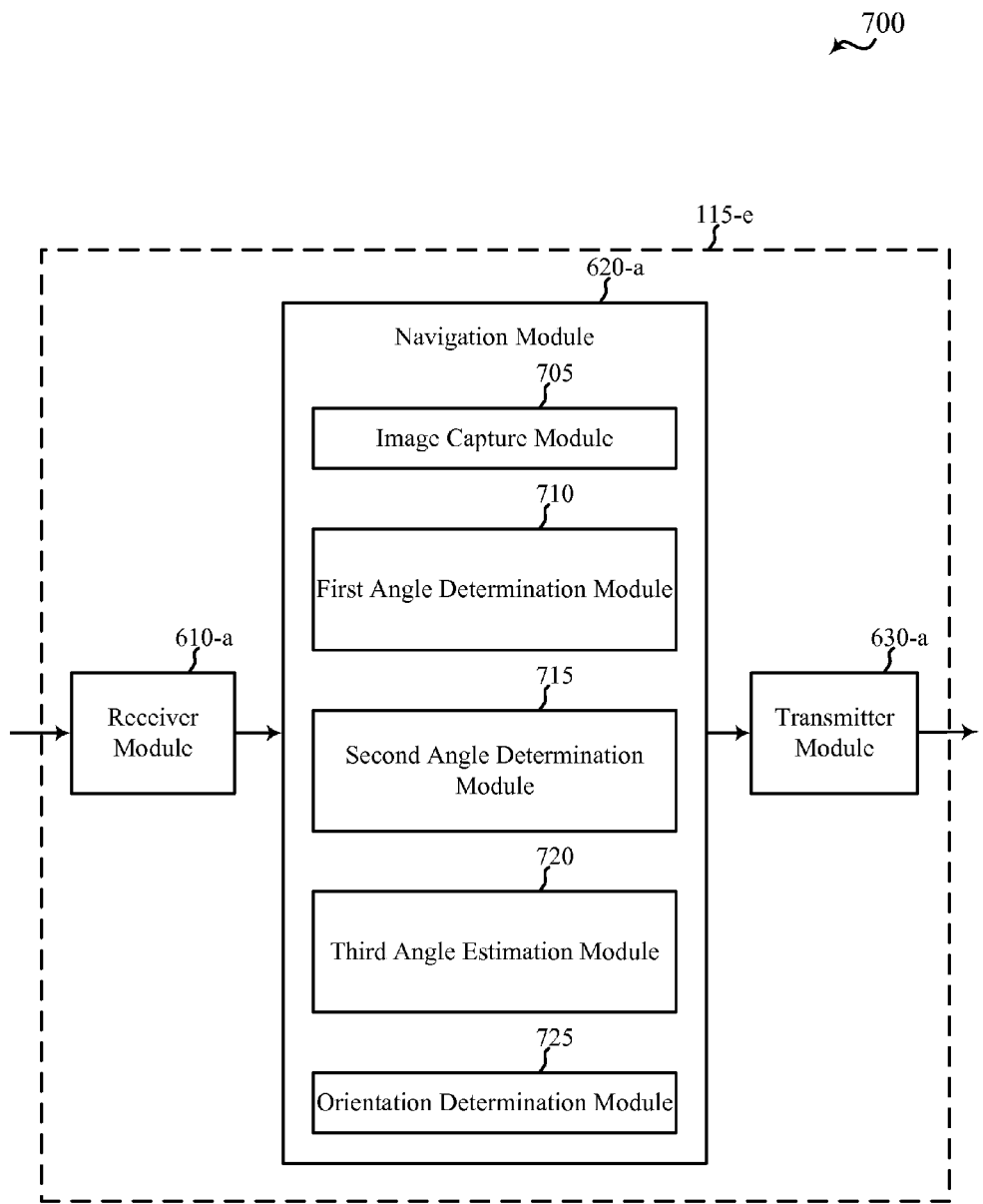
FIG. 7 is a block diagram illustrating an example of a mobile device capable of determining its orientation.

Referring now to FIG. 7, a block diagram 700 illustrates an example of a mobile device 115-e capable of determining its orientation. The mobile device 115-e may be an example of one or more aspects of one of the mobile devices 115 described with reference to FIGS. 1, 2, 3, 5, and/or 6. The mobile device 115-e may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. The mobile device 115-e may include a receiver module 610-a, a navigation module 620-a, and/or a transmitter module 630-a. Each of these components may be in communication with each other.

The receiver module 610-a and the transmitter module 630-a may, in some cases, be configured similarly to the receiver module 610 and the transmitter module 630 described with reference to FIG. 6.

The navigation module 620-*a* may perform various functions. In some examples, the navigation module 620-*a* may be an example of the navigation module 620 described with reference to FIG. 6. In some examples, the navigation module 620-*a* may include an image capture module 705, a first angle determination module 710, a second angle determination module 715, a third angle estimation module 720, and/or an orientation determination module 725.

In some examples, the image capture module 705 may be used to capture an image of at least one illuminated object defining an illuminated reference axis. The at least one illuminated object may in some cases be or include a light fixture, a light bulb, a light rope, and/or another form of illuminated object having a detectable orientation. In some examples, the image of the at least one illuminated object may include an image of at least part of at least one overhead light fixture. In some examples, the illuminated reference axis may be or include an illuminated edge of a polygonal light fixture or light bulb, an illuminated edge of a light fixture or light bulb having an illuminated edge, a line segment defined by a light rope, and/or a line segment defined by at least two illuminated points.

In some examples, the first angle determination module 710 may be used to determine a first angle, between the illuminated reference axis and a device reference axis of the mobile device 115-*e*. The device reference axis may in some cases correspond to a side of an image sensor (e.g., a side of an image sensor that captures the image of the at least one illuminated object), a side of a screen of the mobile device 115-*e*, or a side of the mobile device 115-*e*.

An example of the operation(s) performed by the image capture module 705 and the first angle determination module 710 is described with reference to FIG. 3.

In some examples, the second angle determination module 715 may be used to determine a second angle, between the illuminated reference axis and a common reference axis. In some examples, the common reference axis may correspond to a compass heading (e.g., a meridian passing through magnetic north). In some examples, the second angle determination module 715 may determine the second angle by obtaining the second angle from electronically stored information (e.g., an electronically stored map and/or database). In some examples, obtaining the second angle from electronically stored information may include accessing the electronically stored information over a network (e.g., a cellular network or a Wi-Fi network), while in some examples, obtaining the second angle from electronically stored information may include accessing the electronically stored information on the mobile device 115-*e*. In some examples, the electronically stored information may correspond to a building or other venue, and may be downloaded to the mobile device 115-*e* upon entering or nearing the venue.

An example of the operation(s) performed by the second angle determination module 715 is described with reference to FIG. 4.

In some examples, the third angle estimation module 720 may be used to estimate a third angle, between the device reference axis and the common reference axis.

In some examples, the orientation determination module 725 may be used to determine an orientation of the mobile device 115-*e* based at least in part on the first angle, the second angle, and the third angle.

An example of the operation(s) performed by the third angle estimation module 720 and/or the orientation determination module 725 is described with reference to FIG. 5.

Figure 8:
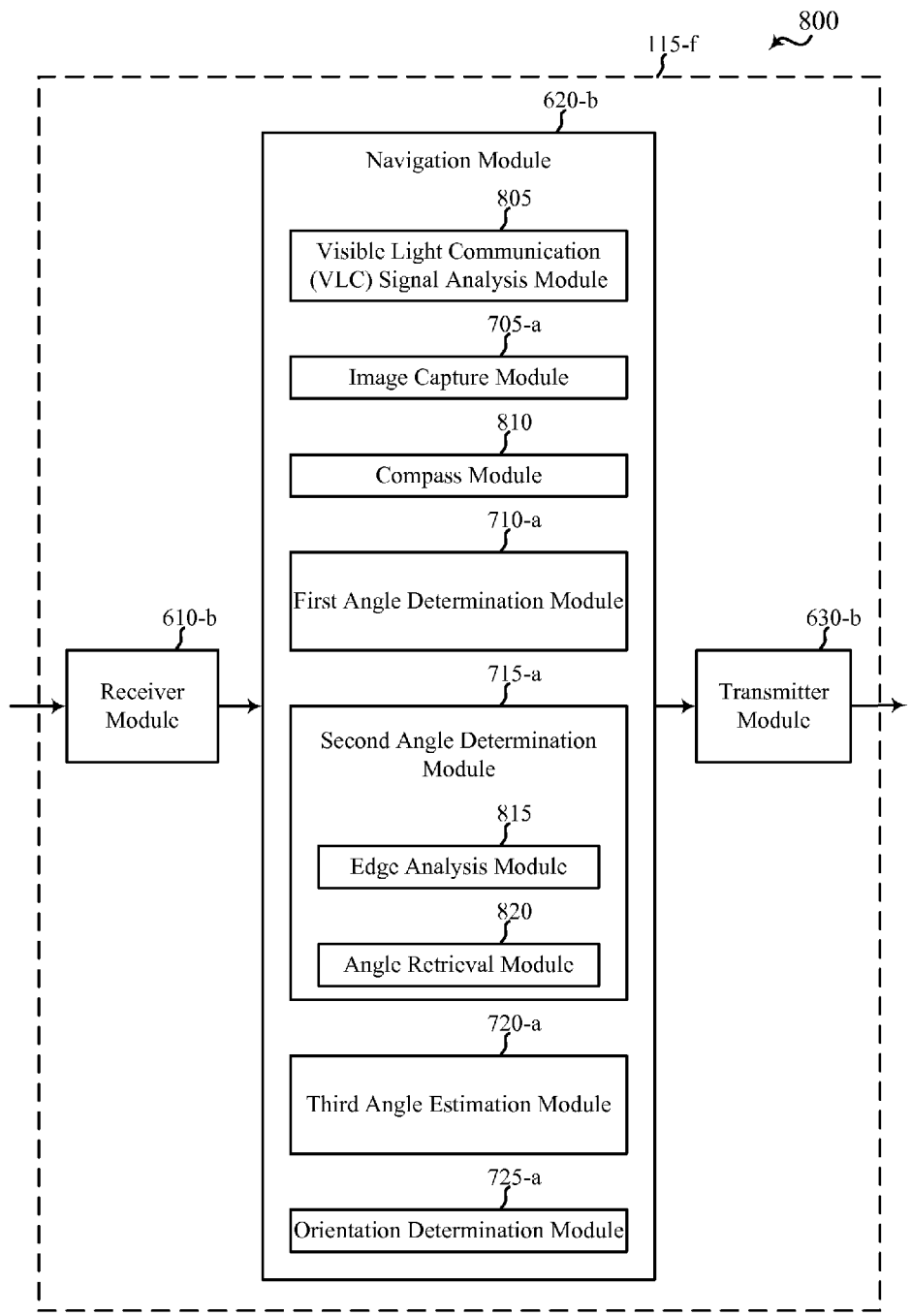
FIG. 8 is a block diagram illustrating an example of a mobile device capable of determining its orientation.

Referring now to FIG. 8, a block diagram 800 illustrates an example of a mobile device 115-*f* capable of determining its orientation. The mobile device 115-*f* may be an example of one or more aspects of one of the mobile devices 115 described with reference to FIGS. 1, 2, 3, 5, 6, and/or 7. The mobile device 115-*f* may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. The mobile device 115-*f* may include a receiver module 610-*b*, a navigation module 620-*b*, and/or a transmitter module 630-*b*. Each of these components may be in communication with each other.

The receiver module 610-*b* and/or the transmitter module 630-*b* may in some cases be configured similarly to the receiver module 610 and/or the transmitter module 630 described with reference to FIG. 6.

The navigation module 620-*b* may perform various functions. In some examples, the navigation module 620-*b* may be an example of the navigation module 620 described with reference to FIGS. 6 and/or 7. In some examples, the navigation module 620-*b* may include a VLC signal analysis module 805, an image capture module 705-*a*, a compass module 810, a first angle determination module 710-*a*, a second angle determination module 715-*a*, a third angle estimation module 720-*a*, and/or an orientation determination module 725-*a*.

In some examples, the VLC signal analysis module 805 may be used to receive a VLC signal including an identifier of an illuminated object. In some examples, the VLC signal analysis module 805 may receive the VLC signal from an illuminated object acting as a VLC transmitter and/or from a VLC transmitter associated with an illuminated object (e.g., an LED). In some examples, the VLC signal analysis module 805 may decode the VLC signal to extract the identifier of the illuminated object.

In some examples, the image capture module 705-*a* may be an example of the image capture module 705 described with reference to FIG. 7. In some examples, the image capture module 705-*a* may be used to capture an image of at least one illuminated object defining an illuminated reference axis. The at least one illuminated object may include an illuminated object identified by a VLC signal received by the VLC signal analysis module 805. The at least one illuminated object may in some cases be or include a light fixture, a light bulb, a light rope, and/or another form of illuminated object having a detectable orientation. In some examples, the image of the at least one illuminated object may include an image of at least part of at least one overhead light fixture. In some examples, the illuminated reference axis may be or include an illuminated edge of a polygonal light fixture or light bulb, an illuminated edge of a light fixture or light bulb having an illuminated edge, a line segment defined by a light rope, and/or a line segment defined by at least two illuminated points.

In some examples, the compass module 810 may be used to acquire a compass reading of the mobile device 115-*f* (e.g., from a compass of the mobile device 115-*f*).

In some examples, the first angle determination module 710-*a* may be an example of the first angle determination module 710 described with reference to FIG. 7. In some examples, the first angle determination module 710-*a* may be used to determine a first angle, between the illuminated reference axis and a device reference axis of the mobile device 115-*f*. The device reference axis may in some cases correspond to a side of an image sensor (e.g., a side of an image sensor that captures the image of the at least one illuminated object), a side of a screen of the mobile device 115-*f*, or a side of the mobile device 115-*f*.

An example of the operation(s) performed by the image capture module 705-*a* and/or the first angle determination module 710-*a* is described with reference to FIG. 3. An example of the operation(s) performed by the compass module 810 is described with reference to FIG. 5.

In some examples, the second angle determination module 715-*a* may be an example of the second angle determination module 715 described with reference to FIG. 7. In some examples, the second angle determination module 715-*a* may be used to determine a second angle, between the illuminated reference axis and a common reference axis, based at least in part on an identifier of an illuminated object received by the VLC signal analysis module 805 (and optionally, based at least in part on a relative length of an edge identified by the edge analysis module 815). In some examples, the common reference axis may correspond to a compass heading (e.g., a meridian passing through magnetic north).

In some examples, the second angle determination module 715-*a* may include an edge analysis module 815 and an angle retrieval module 820. The edge analysis module 815 may be used to identify an edge of at least one illuminated object in an image captured by the image capture module 705-*a*. The edge analysis module 815 may also be used to determine a relative length of the edge. In some examples, the relative length of the edge may be a length of the edge relative to another feature (e.g., another edge) of at least one illuminated object in an image captured by the image capture module 705-*a*. In some examples, the determined relative length of the edge may include an indication of whether the edge is the long edge or the short edge of a rectangular light fixture. The edge identified by the edge analysis module 815 may in some cases be an edge that defines the illuminated reference axis of an image captured by the image capture module 705-*a*.

In some examples, the angle retrieval module 820 may be used to obtain the second angle from electronically stored information (e.g., an electronically stored map and/or database). In some examples, the angle retrieval module 820 may use an identifier of an illuminated object received by the VLC signal analysis module 805 to retrieve, e.g., from electronically stored information, a second angle corresponding to the identified illuminated object. In other examples, the angle retrieval module 820 may use an identifier of an illuminated object received by the VLC signal analysis module 805, in conjunction with a determined relative length of an edge of at least one illuminated object in an image captured by the image capture module 705-*a*, to retrieve, e.g., from electronically stored information, a second angle corresponding to both the identified illuminated object and the identified edge. In some examples, obtaining the second angle from electronically stored information may include accessing the electronically stored information over a network (e.g., a cellular network or a Wi-Fi network), while in some examples, obtaining the second angle from electronically stored information may include accessing the electronically stored information on the mobile device 115-*f*. In some examples, the electronically stored information may correspond to a building or other venue, and may be downloaded to the mobile device 115-*f* upon entering or nearing the venue.

An example of the operation(s) performed by the second angle determination module 715-*a*, the edge analysis module 815, and/or the angle retrieval module 820 is described with reference to FIG. 4.

In some examples, the third angle estimation module 720-*a* may be an example of the third angle estimation module 720 described with reference to FIG. 7. In some examples, the third angle estimation module 720-*a* may be used to estimate a third angle, between the device reference axis and the common reference axis, based at least in part on a compass reading acquired by the compass module 810.

In some examples, the orientation determination module 725-*a* may be an example of the orientation determination module 725 described with reference to FIG. 7. In some examples, the orientation determination module 725-*a* may be used to determine an orientation of the mobile device 115-*f* based at least in part on the first angle, the second angle, and the third angle. More particularly, and in some examples, the orientation determination module 725-*a* may determine, from at least the first angle and the second angle, a set of at least two possible orientations of the mobile device 115-*f*. When the at least one illuminated object for which an image is captured by the image capture module 705-*a* includes a rectangular light fixture and the illuminated reference axis includes an edge of the rectangular light fixture, the set of at least two possible orientations of the mobile device 115-*f* may include two possible orientations of the mobile device 115-*f*. When the at least one illuminated object for which an image is captured by the image capture module 705-*a* includes a square light fixture and the illuminated reference axis includes an edge of the square light fixture, the set of at least two possible orientations of the mobile device 115-*f* may include four possible orientations of the mobile device 115-*f*. The orientation determination module 725-*a* may select the orientation of the mobile device 115-*f*, from the set of at least two possible orientations of the mobile device 115-*f*, based at least in part on the third angle estimated by the third angle estimation module 720-*a*. In this manner, the third angle (e.g., an angle based on a compass reading that may be somewhat imprecise because of the effects of magnetic influences inside a building or other structure) may be used to select a more precise orientation of the mobile device 115-*f* from a set of at least two possible orientations of the mobile device 115-*f*.

An example of the operation(s) performed by the third angle estimation module 720-*a* and/or the orientation determination module 725-*a* is described with reference to FIG. 5.

Figure 9:
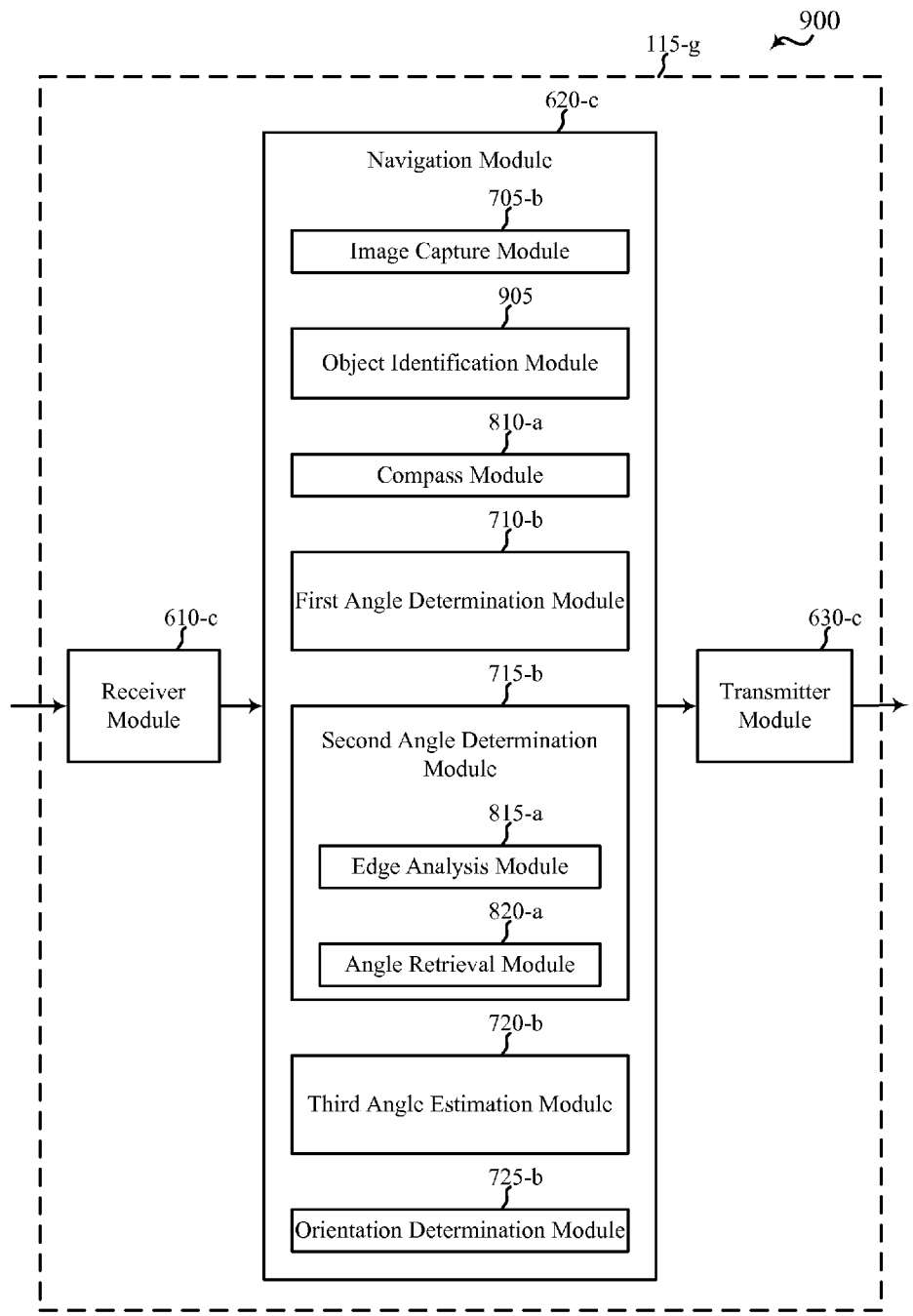
FIG. 9 is a block diagram illustrating an example of a mobile device capable of determining its orientation.

Referring now to FIG. 9, a block diagram 900 illustrates an example of a mobile device 115-*g* capable of determining its orientation. The mobile device 115-*g* may be an example of one or more aspects of one of the mobile devices 115 described with reference to FIGS. 1, 2, 3, 5, 6, and/or 7. The mobile device 115-*g* may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. The mobile device 115-*g* may include a receiver module 610-*c*, a navigation module 620-*c*, and/or a transmitter module 630-*c*. Each of these components may be in communication with each other.

The receiver module 610-*c* and/or the transmitter module 630-*c* may in some cases be configured similarly to the receiver module 610 and/or the transmitter module 630 described with reference to FIG. 6.

The navigation module 620-*c* may perform various functions. In some examples, the navigation module 620-*c* may be an example of the navigation module 620 described with reference to FIGS. 6 and/or 7. In some examples, the navigation module 620-*c* may include an image capture module 705-*b*, an object identification module 905, a compass module 810-*a*, a first angle determination module 710-*b*, a second angle determination module 715-*b*, a third angle estimation module 720-*b*, and/or an orientation determination module 725-*b*.

In some examples, the image capture module 705-*b* may be an example of the image capture module 705 described with reference to FIG. 7. In some examples, the image capture module 705-*b* may be used to capture an image of at least one illuminated object defining an illuminated reference axis. The at least one illuminated object may in some cases be or include a light fixture, a light bulb, a light rope, and/or another form of illuminated object having a detectable orientation. In some examples, the image of the at least one illuminated object may include an image of at least part of at least one overhead light fixture. In some examples, the illuminated reference axis may be or include an illuminated edge of a polygonal light fixture or light bulb, an illuminated edge of a light fixture or light bulb having an illuminated edge, a line segment defined by a light rope, and/or a line segment defined by at least two illuminated points.

In some examples, the object identification module 905 may be used determine, from the image of the at least one illuminated object, a visual identifier of an illuminated object in the image. The visual identifier may include a visually illuminated indicia on the illuminated object, such as a unique or quasi-unique pattern of light and dark elements, color, and/or pattern of colored elements.

In some examples, the compass module 810-*a* may be used to acquire a compass reading of the mobile device 115-*g* (e.g., from a compass of the mobile device 115-*g*).

In some examples, the first angle determination module 710-*b* may be an example of the first angle determination module 710 described with reference to FIG. 7. In some examples, the first angle determination module 710-*b* may be used to determine a first angle, between the illuminated reference axis and a device reference axis of the mobile device 115-*g*. The device reference axis may in some cases correspond to a side of an image sensor (e.g., a side of an image sensor that captures the image of the at least one illuminated object), a side of a screen of the mobile device 115-*g*, or a side of the mobile device 115-*g*.

An example of the operation(s) performed by the image capture module 705-*b* and/or the first angle determination module 710-*b* is described with reference to FIG. 3. An example of the operation(s) performed by the compass module 810-*a* is described with reference to FIG. 5.

In some examples, the second angle determination module 715-*b* may be an example of the second angle determination module 715 described with reference to FIG. 7. In some examples, the second angle determination module 715-*b* may be used to determine a second angle, between the illuminated reference axis and a common reference axis, based at least in part on a visual identifier of an illuminated object determined by the object identification module 905 (and optionally, based at least in part on a relative length of an edge identified by an edge analysis module 815-*a*). In some examples, the common reference axis may correspond to a compass heading (e.g., a meridian passing through magnetic north).

In some examples, the second angle determination module 715-*b* may include the edge analysis module 815-*a* and an angle retrieval module 820-*a*. The edge analysis module 815-*a* may be used to identify an edge of at least one illuminated object in an image captured by the image capture module 705-*b*. The edge analysis module 815-*a* may also be used to determine a relative length of the edge. In some examples, the relative length of the edge may be a length of the edge relative to another feature (e.g., another edge) of at least one illuminated object in an image captured by the image capture module 705-*b*. In some examples, the determined relative length of the edge may include an indication of whether the edge is the long edge or the short edge of a rectangular light fixture. The edge identified by the edge analysis module 815-*a* may, in some cases, be an edge that defines the illuminated reference axis of an image captured by the image capture module 705-*b*.

In some examples, the angle retrieval module 820-*a* may be used to obtain the second angle from electronically stored information (e.g., an electronically stored map and/or database). In some examples, the angle retrieval module 820-*a* may use a visual identifier of an illuminated object determined by the object identification module 905 to retrieve, e.g., from electronically stored information, a second angle corresponding to the visually identified illuminated object. In other examples, the angle retrieval module 820-*a* may use a visual identifier of an illuminated object determined by the object identification module 905, in conjunction with a determined relative length of an edge of at least one illuminated object in an image captured by the image capture module 705-*b*, to retrieve, e.g., from electronically stored information, a second angle corresponding to both the visually identified illuminated object and the identified edge. In some examples, obtaining the second angle from electronically stored information may include accessing the electronically stored information over a network (e.g., a cellular network or a Wi-Fi network), while in some examples, obtaining the second angle from electronically stored information may include accessing the electronically stored information on the mobile device 115-*g*. In some examples, the electronically stored information may correspond to a building or other venue, and may be downloaded to the mobile device 115-*g* upon entering or nearing the venue.

An example of the operation(s) performed by the second angle determination module 715-*b*, the edge analysis module 815-*a*, and/or the angle retrieval module 820-*b* is described with reference to FIG. 4.

In some examples, the third angle estimation module 720-*b* may be an example of the third angle estimation module 720 described with reference to FIG. 7. In some examples, the third angle estimation module 720-*b* may be used to estimate a third angle, between the device reference axis and the common reference axis, based at least in part on a compass reading acquired by the compass module 810-*a*.

In some examples, the orientation determination module 725-*b* may be an example of the orientation determination module 725 described with reference to FIG. 7. In some examples, the orientation determination module 725-*b* may be used to determine an orientation of the mobile device 115-*g* based at least in part on the first angle, the second angle, and the third angle. More particularly, and in some examples, the orientation determination module 725-*b* may determine, from at least the first angle and the second angle, a set of at least two possible orientations of the mobile device 115-*g*. When the at least one illuminated object for which an image is captured by the image capture module 705-*b* includes a rectangular light fixture and the illuminated reference axis includes an edge of the rectangular light fixture, the set of at least two possible orientations of the mobile device 115-*g* may include two possible orientations of the mobile device 115-*g*. When the at least one illuminated object for which an image is captured by the image capture module 705-*b* includes a square light fixture and the illuminated reference axis includes an edge of the square light fixture, the set of at least two possible orientations of the mobile device 115-*g* may include four possible orientations of the mobile device 115-*g*. The orientation determination module 725-*b* may select the orientation of the mobile device 115-g, from the set of at least two possible orientations of the mobile device 115-g, based at least in part on the third angle estimated by the third angle estimation module 720-b. In this manner, the third angle (e.g., an angle based on a compass reading that may be somewhat imprecise because of the effects of magnetic influences inside a building or other structure) may be used to select a more precise orientation of the mobile device 115-g from a set of at least two possible orientations of the mobile device 115-g.

An example of the operation(s) performed by the third angle estimation module 720-a and/or the orientation determination module 725-a is described with reference to FIG. 5.

Figure 10:
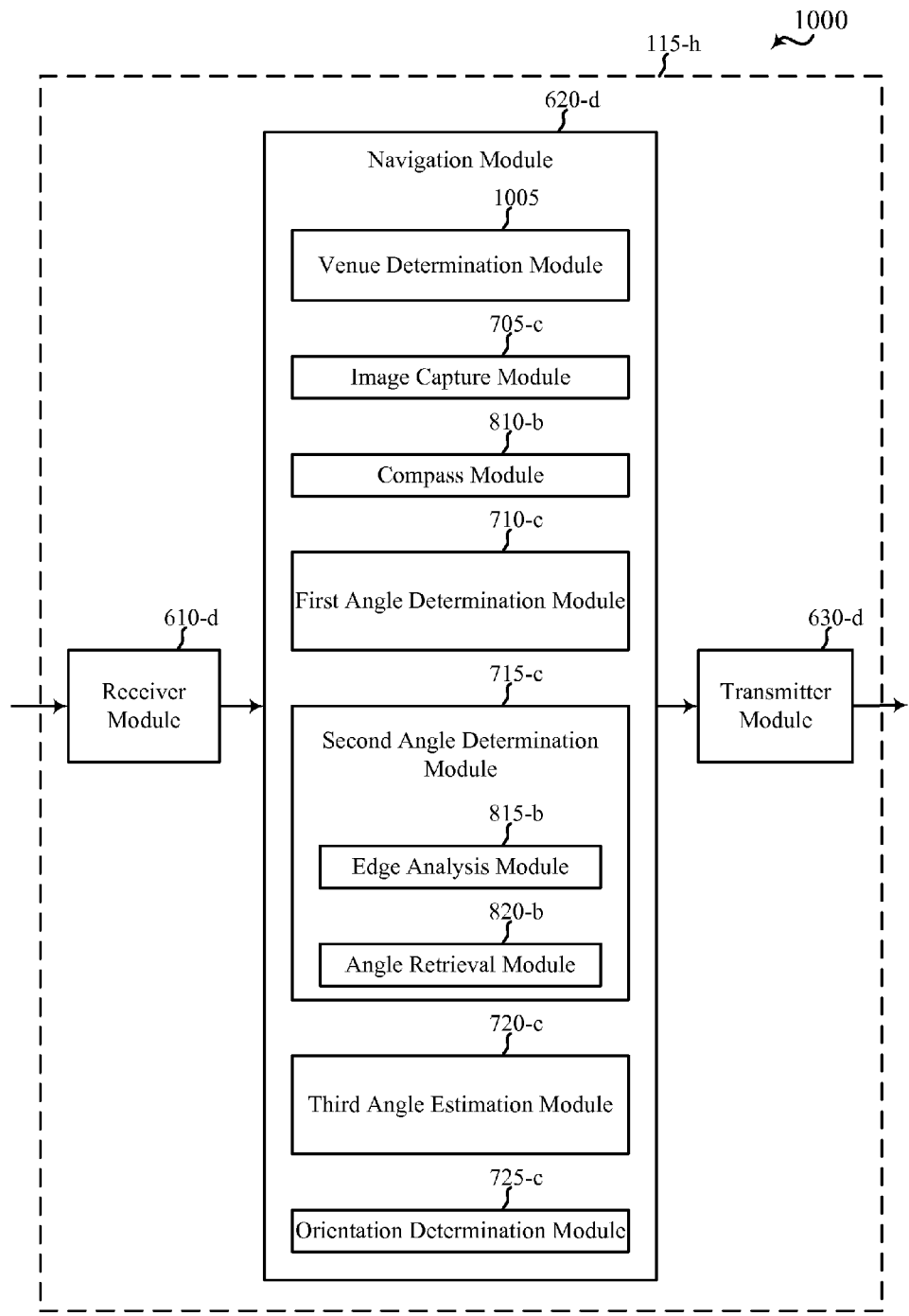
FIG. 10 is a block diagram illustrating an example of a mobile device capable of determining its orientation.

Referring now to FIG. 10, a block diagram 1000 illustrates an example of a mobile device 115-h capable of determining its orientation. The mobile device 115-h may be an example of one or more aspects of one of the mobile devices 115 described with reference to FIGS. 1, 2, 3, 5, 6, and/or 7. The mobile device 115-h may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. The mobile device 115-h may include a receiver module 610-d, a navigation module 620-d, and/or a transmitter module 630-d. Each of these components may be in communication with each other.

The receiver module 610-d and/or the transmitter module 630-d may in some cases be configured similarly to the receiver module 610 and/or the transmitter module 630 described with reference to FIG. 6.

The navigation module 620-d may perform various functions. In some examples, the navigation module 620-d may be an example of the navigation module 620 described with reference to FIGS. 6 and/or 7. In some examples, the navigation module 620-d may include a venue determination module 1005, an image capture module 705-c, a compass module 810-b, a first angle determination module 710-c, a second angle determination module 715-c, a third angle estimation module 720-c, and/or an orientation determination module 725-c.

In some examples, the venue determination module 1005 may be used to determine a venue in which the mobile device 115-h is located (e.g., a building or other structure in which the mobile device 115-h is located). In some examples, the venue may be determined based on global positioning system (GPS) signals or the identity of a Wi-Fi network accessible to the mobile device 115-h.

In some examples, the image capture module 705-c may be an example of the image capture module 705 described with reference to FIG. 7. In some examples, the image capture module 705-c may be used to capture an image of at least one illuminated object defining an illuminated reference axis. The at least one illuminated object may in some cases be or include a light fixture, a light bulb, a light rope, and/or another form of illuminated object having a detectable orientation. In some examples, the image of the at least one illuminated object may include an image of at least part of at least one overhead light fixture. In some examples, the illuminated reference axis may be or include an illuminated edge of a polygonal light fixture or light bulb, an illuminated edge of a light fixture or light bulb having an illuminated edge, a line segment defined by a light rope, and/or a line segment defined by at least two illuminated points.

In some examples, the compass module 810-b may be used to acquire a compass reading of the mobile device 115-h (e.g., from a compass of the mobile device 115-h).

In some examples, the first angle determination module 710-c may be an example of the first angle determination module 710 described with reference to FIG. 7. In some examples, the first angle determination module 710-c may be used to determine a first angle, between the illuminated reference axis and a device reference axis of the mobile device 115-h. The device reference axis may in some cases correspond to a side of an image sensor (e.g., a side of an image sensor that captures the image of the at least one illuminated object), a side of a screen of the mobile device 115-h, or a side of the mobile device 115-h.

An example of the operation(s) performed by the image capture module 705-c and/or the first angle determination module 710-c is described with reference to FIG. 3. An example of the operation(s) performed by the compass module 810-b is described with reference to FIG. 5.

In some examples, the second angle determination module 715-c may be an example of the second angle determination module 715 described with reference to FIG. 7. In some examples, the second angle determination module 715-c may be used to determine a second angle, between the illuminated reference axis and a common reference axis, based at least in part on the venue of the mobile device 115-h (and optionally, based at least in part on a relative length of an edge identified by an edge analysis module 815-b). In some examples, the common reference axis may correspond to a compass heading (e.g., a meridian passing through magnetic north).

In some examples, the second angle determination module 715-c may include the edge analysis module 815-b and an angle retrieval module 820-b. The edge analysis module 815-b may be used to identify an edge of at least one illuminated object in an image captured by the image capture module 705-c. The edge analysis module 815-b may also be used to determine a relative length of the edge. In some examples, the relative length of the edge may be a length of the edge relative to another feature (e.g., another edge) of at least one illuminated object in an image captured by the image capture module 705-c. In some examples, the determined relative length of the edge may include an indication of whether the edge is the long edge or the short edge of a rectangular light fixture. The edge identified by the edge analysis module 815-b may in some cases be an edge that defines the illuminated reference axis of an image captured by the image capture module 705-c.

In some examples, the angle retrieval module 820-b may be used to obtain the second angle from electronically stored information (e.g., an electronically stored map and/or database). In some examples, the angle retrieval module 820-b may use the venue of the mobile device 115-h to retrieve, e.g., from electronically stored information, a second angle corresponding to the at least one illuminated object. In other examples, the angle retrieval module 820-b may use the venue of the mobile device 115-h, in conjunction with a determined relative length of an edge of at least one illuminated object in an image captured by the image capture module 705-c, to retrieve, e.g., from electronically stored information, a second angle corresponding to both the at least one illuminated object and the identified edge. In some examples, obtaining the second angle from electronically stored information may include accessing the electronically stored information over a network (e.g., a cellular network or a Wi-Fi network), while in some examples, obtaining the second angle from electronically stored information may include accessing the electronically stored information on the mobile device 115-h. In some examples, the electronically stored information may correspond to a building or other venue, and may be downloaded to the mobile device 115-*h* upon entering or nearing the venue.

An example of the operation(s) performed by the second angle determination module 715-*c*, the edge analysis module 815-*b*, and/or the angle retrieval module 820-*c* is described with reference to FIG. 4.

In some examples, the third angle estimation module 720-*c* may be an example of the third angle estimation module 720 described with reference to FIG. 7. In some examples, the third angle estimation module 720-*c* may be used to estimate a third angle, between the device reference axis and the common reference axis, based at least in part on a compass reading acquired by the compass module 810-*b*.

In some examples, the orientation determination module 725-*c* may be an example of the orientation determination module 725 described with reference to FIG. 7. In some examples, the orientation determination module 725-*c* may be used to determine an orientation of the mobile device 115-*h* based at least in part on the first angle, the second angle, and the third angle. More particularly, and in some examples, the orientation determination module 725-*c* may determine, from at least the first angle and the second angle, a set of at least two possible orientations of the mobile device 115-*h*. When the at least one illuminated object for which an image is captured by the image capture module 705-*c* includes a rectangular light fixture and the illuminated reference axis includes an edge of the rectangular light fixture, the set of at least two possible orientations of the mobile device 115-*h* may include two possible orientations of the mobile device 115-*h*. When the at least one illuminated object for which an image is captured by the image capture module 705-*c* includes a square light fixture and the illuminated reference axis includes an edge of the square light fixture, the set of at least two possible orientations of the mobile device 115-*h* may include four possible orientations of the mobile device 115-*h*. The orientation determination module 725-*c* may select the orientation of the mobile device 115-*h*, from the set of at least two possible orientations of the mobile device 115-*h*, based at least in part on the third angle estimated by the third angle estimation module 720-*c*. In this manner, the third angle (e.g., an angle based on a compass reading that may be somewhat imprecise because of the effects of magnetic influences inside a building or other structure) may be used to select a more precise orientation of the mobile device 115-*h* from a set of at least two possible orientations of the mobile device 115-*h*.

An example of the operation(s) performed by the third angle estimation module 720-*c* and/or the orientation determination module 725-*c* is described with reference to FIG. 5.

Figure 11:
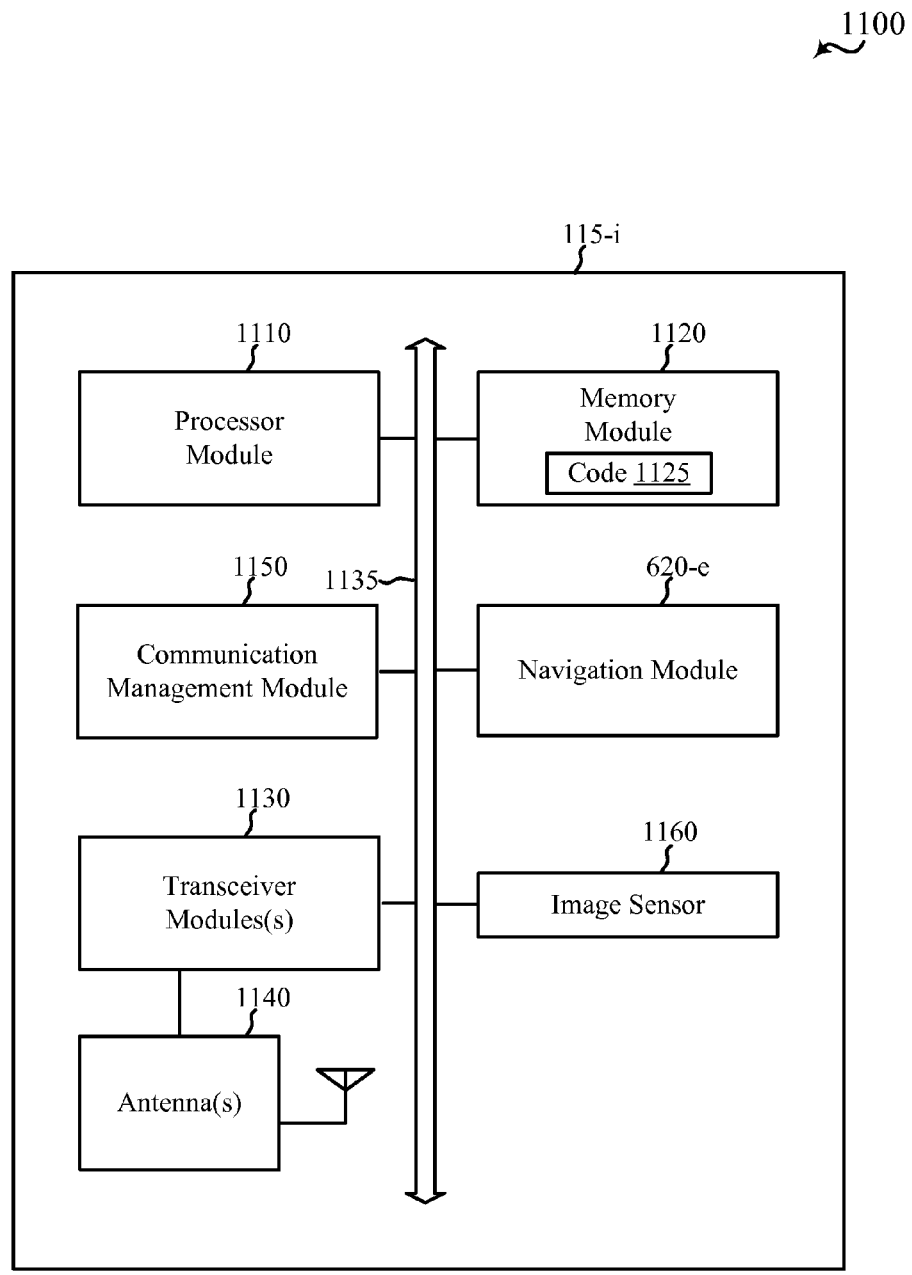
FIG. 11 is a block diagram illustrating an example of a mobile device capable of determining its orientation.

FIG. 11 is a block diagram 1100 illustrating an example of a mobile device 115-*i* capable of determining its orientation. The mobile device 115-*i* may be an example of one or more aspects of one of the mobile devices 115 described with reference to FIGS. 1, 2, 3, 5, 6, 7, 8, 9, and/or 10. The mobile device 115-*i* may have any of various configurations and may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. In some embodiments, the mobile device 115-*i* may have an internal power supply (not shown), such as a small battery, to facilitate mobile operation.

The mobile device 115-*i* may include a processor module 1110, a memory module 1120, at least one transceiver module (represented by transceiver module(s) 1130), at least one antenna (represented by antenna(s) 1140), an image sensor 1160, and/or a navigation module 620-*e*. Each of these components may be in communication with each other, directly or indirectly, over one or more buses 1135.

The memory module 1120 may include random access memory (RAM) and/or read-only memory (ROM). The memory module 1120 may store computer-readable, computer-executable code 1125 containing instructions that are configured to, when executed, cause the processor module 1110 to perform various functions described herein for connecting to and/or configuring one or more other devices. Alternatively, the code 1125 may not be directly executable by the processor module 1110 but be configured to cause the mobile device 115-*i* (e.g., when compiled and executed) to perform various of the functions described herein.

The processor module 1110 may include an intelligent hardware device, e.g., a CPU, such as an ARM® based processor or those made by Intel® Corporation or AMD®, a microcontroller, an ASIC, etc. The processor module 1110 may process information received through the transceiver module(s) 1130 and/or image sensor 1160, as well as information to be sent to the transceiver module(s) 1130 for transmission via the antenna(s) 1140. The processor module 1110 may handle, alone or in connection with the navigation module 620-*e*, various aspects pertaining to device navigation, including, for example, the determination of an orientation of the mobile device 115-*i*.

The transceiver module(s) 1130 may include a modem configured to modulate packets and provide the modulated packets to the antenna(s) 1140 for transmission, and to demodulate packets received from the antenna(s) 1140. The transceiver module(s) 1130 may in some cases be implemented as one or more transmitter modules and one or more separate receiver modules. The transceiver module(s) 1130 may be configured to communicate bi-directionally, via the antenna(s) 1140, with one or more other devices, such as one or more access points such as one or more of the access points described with reference to FIG. 1, one or more VLC transmitters such as one or more of the VLC transmitters described with reference to FIGS. 1 and/or 2, and/or one or more other mobile devices such as one or more of the mobile devices described with reference to FIGS. 1, 2, 3, 5, 6, 7, 8, 9, and/or 10. In some cases, the mobile device 115-*i* may be a cellular device capable of communicating with one or more base stations and/or other cellular devices, and/or a Wi-Fi device capable of communicating with one or more Wi-Fi access points and/or other Wi-Fi devices. While the mobile device 115-*i* may include a single antenna, there may be embodiments in which the mobile device 115-*i* may include multiple antennas 1140.

The image sensor 1160 may in some cases include a complimentary metal-oxide semiconductor (CMOS) image sensor. The image sensor 1160 may receive light emitted from one or more illuminated objects and/or one or more VLC transmitters. In some cases, the mobile device 115-*i* may also include an ambient light sensor, such as an ambient light sensor including one or more photodiodes capable of detecting VLC signals transmitted by VLC transmitters.

The navigation module 620-*e* may be an example of one or more aspects of the navigation module 620 described with reference to FIGS. 6, 7, 8, 9, and/or 10. By way of example, the navigation module 620-*e* may be a component of the mobile device 115-*i* in communication with some or all of the other components of the mobile device 115-*i* over one or more buses 1135. Alternatively, functionality of the navigation module 620-e may be implemented as a computer program product and/or as one or more controller elements of the processor module 1110.

According to the architecture of FIG. 11, the mobile device 115-i may further include a communication management module 1150. The communication management module 1150 may manage communications with one or more access points 205, one or more VLC transmitters, and/or one or more other mobile devices 115. By way of example, the communication management module 1150 may be a component of the mobile device 115-i in communication with some or all of the other components of the mobile device 115-i via one or more buses 1135. Alternatively, functionality of the communication management module 1150 may be implemented as a component of the transceiver module(s) 1130, as a computer program product, and/or as one or more controller elements of the processor module 1110.

The components of the mobile device 115-i may, individually or collectively, be implemented using one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the mobile device 115-i.

Figure 12:
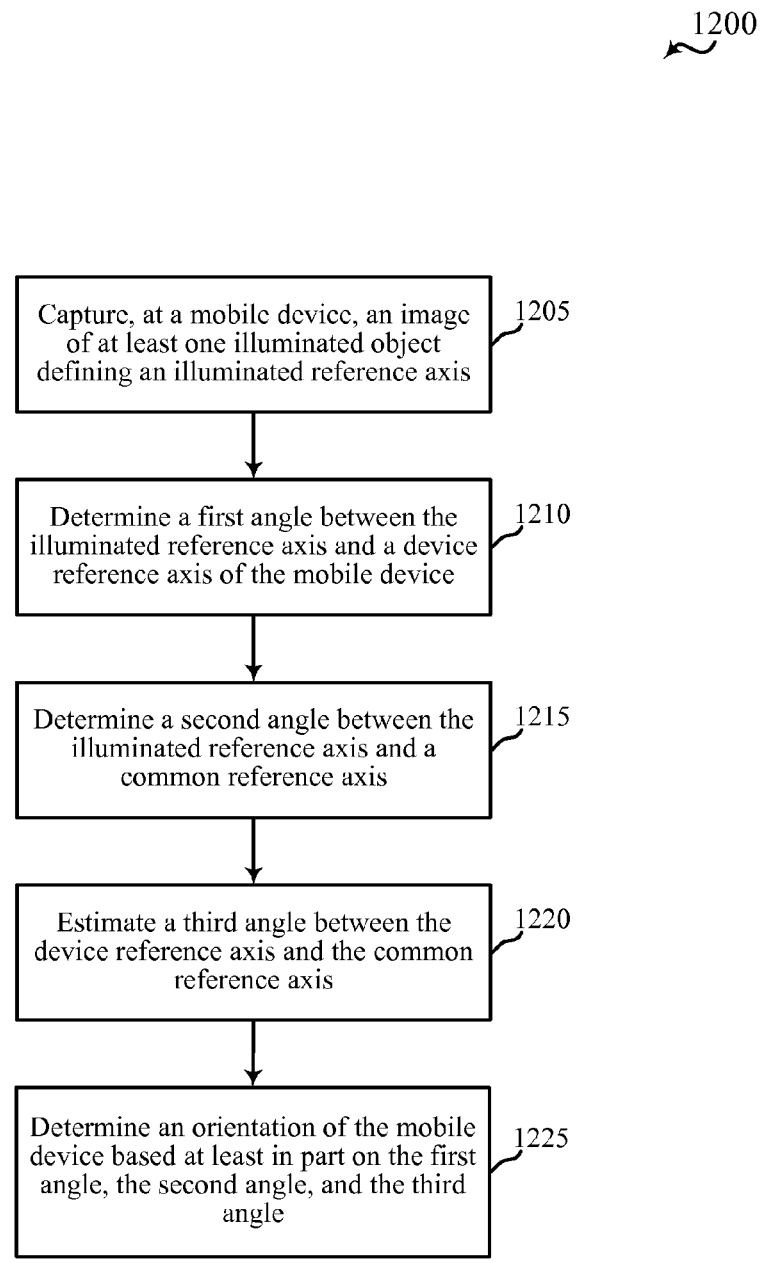
FIG. 12 is a flow chart illustrating a method for determining an orientation of a mobile device.

FIG. 12 is a flow chart illustrating a method 1200 for determining an orientation of a mobile device. For clarity, the method 1200 is described below with reference to aspects of one or more of the mobile devices 115 described with reference to FIGS. 1, 2, 3, 5, 6, 7, 8, 9, 10, and/or 11. In some examples, the navigation module 620 described with reference to FIGS. 6, 7, 8, 9, 10, and/or 11 may execute one or more sets of codes to control the functional elements of a mobile device 115 to perform the functions described below.

At block 1205, the method 1200 may include capturing, at a mobile device 115, an image of at least one illuminated object defining an illuminated reference axis. The mobile device 115 may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. The at least one illuminated object may in some cases be or include a light fixture, a light bulb, a light rope, and/or other form of illuminated object having a detectable orientation. In some examples, capturing the image of the at least one illuminated object may include capturing an image of at least part of at least one overhead light fixture. In some examples, the illuminated reference axis may be or include an illuminated edge of a polygonal light fixture or light bulb, an illuminated edge of a light fixture or light bulb having an illuminated edge, a line segment defined by a light rope, and/or a line segment defined by at least two illuminated points. The operation(s) at block 1205 may be performed and/or managed using the navigation module 620 described with reference to FIGS. 6, 7, 8, 9, 10, and/or 11, and/or the image capture module 705 described with reference to FIGS. 7, 8, 9, and/or 10.

At block 1210, the method 1200 may include determining a first angle, between the illuminated reference axis and a device reference axis of the mobile device 115. The device reference axis may in some cases correspond to a side of an image sensor (e.g., a side of an image sensor that captures the image of the at least one illuminated object), a side of a screen of the mobile device 115, or a side of the mobile device 115. The operation(s) at block 1210 may be performed and/or managed using the navigation module 620 described with reference to FIGS. 6, 7, 8, 9, 10, and/or 11, and/or the first angle determination module 710 described with reference to FIGS. 7, 8, 9, and/or 10.

An example of the operation(s) performed at block 1205 and/or block 1210 is described with reference to FIG. 3.

At block 1215, the method 1200 may include determining a second angle, between the illuminated reference axis and a common reference axis. In some examples, the common reference axis may correspond to a compass heading (e.g., a meridian passing through magnetic north). In some examples, determining the second angle may include obtaining the second angle from electronically stored information (e.g., an electronically stored map and/or database). In some examples, obtaining the second angle from electronically stored information may include accessing the electronically stored information over a network (e.g., a cellular network or a Wi-Fi network), while in some examples, obtaining the second angle from electronically stored information may include accessing the electronically stored information on the mobile device 115. In some examples, the electronically stored information may correspond to a building or other venue, and may be downloaded to the mobile device 115 upon entering or nearing the venue. The operation(s) at block 1215 may be performed and/or managed using the navigation module 620 described with reference to FIGS. 6, 7, 8, 9, 10, and/or 11, and/or the second angle determination module 715 described with reference to FIGS. 7, 8, 9, and/or 10.

An example of the operation(s) performed at block 1215 is described with reference to FIG. 4.

At block 1220, the method 1200 may include estimating a third angle, between the device reference axis and the common reference axis. The operation(s) at block 1220 may be performed and/or managed using the navigation module 620 described with reference to FIGS. 6, 7, 8, 9, 10, and/or 11, and/or the third angle estimation module 720 described with reference to FIGS. 7, 8, 9, and/or 10.

At block 1225, the method 1200 may include determining an orientation of the mobile device 115 based at least in part on the first angle, the second angle, and the third angle. The operation(s) at block 1225 may be performed and/or managed using the navigation module 620 described with reference to FIGS. 6, 7, 8, 9, 10, and/or 11, and/or the orientation determination module 725 described with reference to FIGS. 7, 8, 9, and/or 10.

An example of the operation(s) performed at block 1220 and/or block 1225 is described with reference to FIG. 5.

Therefore, the method 1200 may be used for wireless communication. It should be noted that the method 1200 is just one implementation and that the operations of the method 1200 may be rearranged or otherwise modified such that other implementations are possible.

Figure 13:
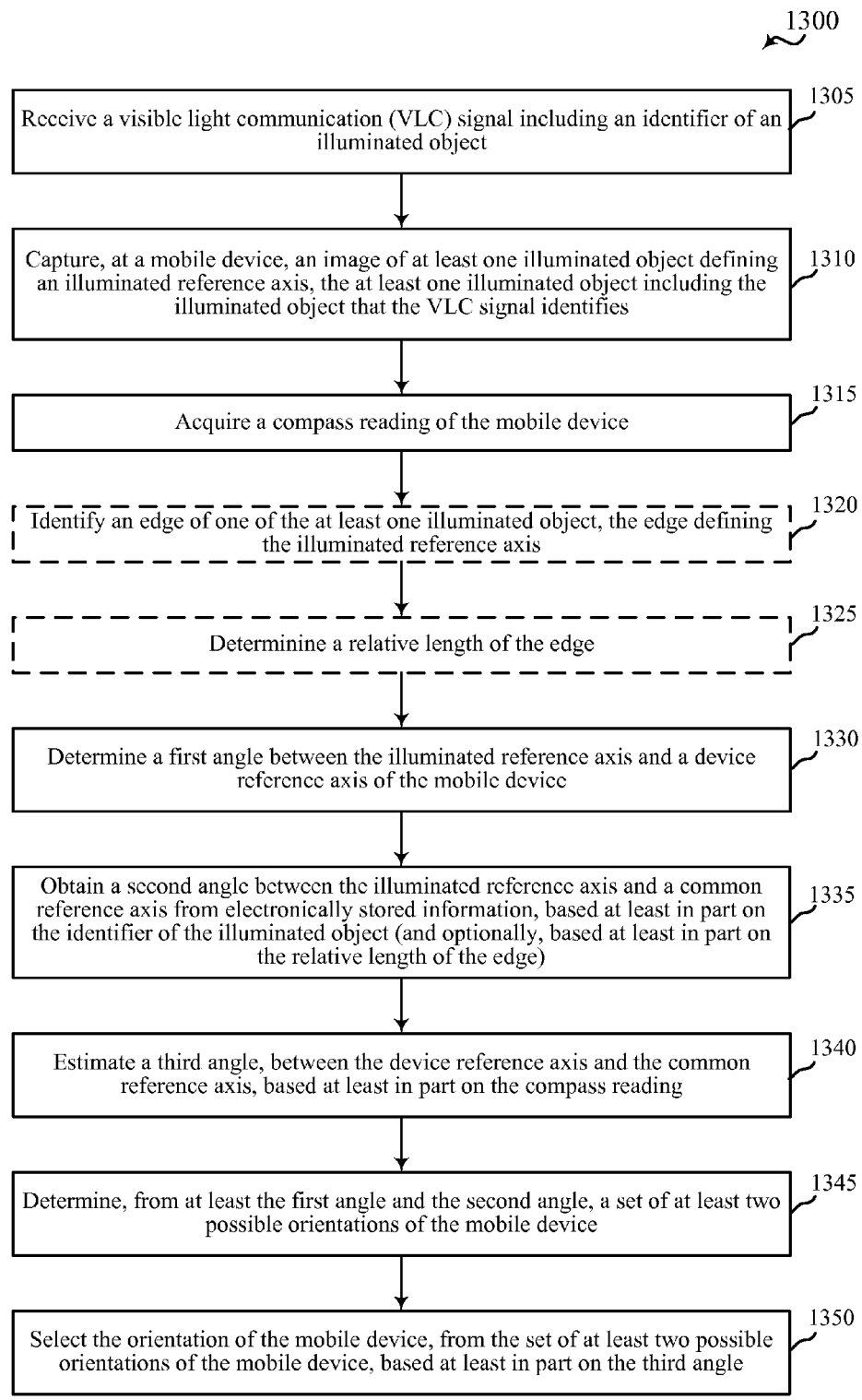
FIG. 13 is a flow chart illustrating a method for determining an orientation of a mobile device.

FIG. 13 is a flow chart illustrating a method 1300 for determining an orientation of a mobile device. For clarity, the method 1300 is described below with reference to aspects of one or more of the mobile devices 115 described with reference to FIGS. 1, 2, 3, 5, 6, 7, 8, 9, 10, and/or 11. In some examples, the navigation module 620 described with reference to FIGS. 6, 7, 8, 9, 10, and/or 11 may execute one or more sets of codes to control the functional elements of a mobile device 115 to perform the functions described below.

At block 1305, the method 1300 may include receiving a VLC signal including an identifier of an illuminated object. In some examples, the VLC signal may be received from an illuminated object acting as a VLC transmitter and/or a VLC transmitter associated with an illuminated object (e.g., an LED). In some examples, receiving the VLC signal may include decoding the VLC signal to extract the identifier of the illuminated object. The operation(s) at block 1305 may be performed and/or managed using the navigation module 620 described with reference to FIGS. 6, 7, 8, 9, 10, and/or 11, and/or the VLC signal analysis module 805 described with reference to FIG. 8.

At block 1310, the method 1300 may include capturing, at a mobile device 115, an image of at least one illuminated object defining an illuminated reference axis. The at least one illuminated object may include the illuminated object identified by the VLC signal received at block 1305. The mobile device 115 may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. The at least one illuminated object may in some cases be or include a light fixture, a light bulb, a light rope, and/or other form of illuminated object having a detectable orientation. In some examples, capturing the image of the at least one illuminated object may include capturing an image of at least part of at least one overhead light fixture. In some examples, the illuminated reference axis may be or include an illuminated edge of a polygonal light fixture or light bulb, an illuminated edge of a light fixture or light bulb having an illuminated edge, a line segment defined by a light rope, and/or a line segment defined by at least two illuminated points. The operation(s) at block 1310 may be performed and/or managed using the navigation module 620 described with reference to FIGS. 6, 7, 8, 9, 10, and/or 11, and/or the image capture module 705 described with reference to FIGS. 7, 8, 9, and/or 10. An example of the operation(s) performed at block 1310 is described with reference to FIG. 3.

At block 1315, the method 1300 may include acquiring a compass reading of the mobile device 115 (e.g., from a compass of the mobile device 115). The operation(s) at block 1315 may be performed and/or managed using the navigation module 620 described with reference to FIGS. 6, 7, 8, 9, 10, and/or 11, and/or the compass module 810 described with reference to FIG. 8. An example of the operation(s) performed at block 1315 is described with reference to FIG. 5.

Optionally, at block 1320, the method 1300 may include identifying an edge of one of the at least one illuminated object. The edge may define the illuminated reference axis. At block 1325, the method 1300 may include determining a relative length of the edge. In some examples, the relative length of the edge may be a length of the edge relative to another feature (e.g., another edge) of the at least one illuminated object in the image of the at least one illuminated object. In some examples, the determined relative length of the edge may include an indication of whether the edge is the long edge or the short edge of a rectangular light fixture. The operation(s) at block 1320 and/or block 1325 may be performed and/or managed using the navigation module 620 described with reference to FIGS. 6, 7, 8, 9, 10, and/or 11, and/or the edge analysis module 815 described with reference to FIGS. 8, 9, and/or 10. An example of the operation(s) performed at block 1320 and/or block 1325 is described with reference to FIG. 4.

At block 1330, the method 1300 may include determining a first angle, between the illuminated reference axis and a device reference axis of the mobile device 115. The device reference axis may in some cases correspond to a side of an image sensor (e.g., a side of an image sensor that captures the image of the at least one illuminated object), a side of a screen of the mobile device 115, or a side of the mobile device 115. The operation(s) at block 1330 may be performed and/or managed using the navigation module 620 described with reference to FIGS. 6, 7, 8, 9, 10, and/or 11, and/or the first angle determination module 710 described with reference to FIGS. 7, 8, 9, and/or 10. An example of the operation(s) performed at block 1330 is described with reference to FIG. 3.

At block 1335, the method 1300 may include determining a second angle, between the illuminated reference axis and a common reference axis, based at least in part on the identifier of the illuminated object received at block 1305 (and optionally, based at least in part on the relative length of the edge identified at block 1320). For example, the identifier of the illuminated object may be used to retrieve, e.g., from electronically stored information, a second angle corresponding to the identified illuminated object. Optionally, the identifier of the illuminated object and the relative length of the edge may be used to retrieve, e.g., from electronically stored information, a second angle corresponding to both the identified illuminated object and the identified edge. In some examples, the electronically stored information may include an electronically stored map and/or database. In some examples, obtaining the second angle from electronically stored information may include accessing the electronically stored information over a network (e.g., a cellular network or a Wi-Fi network), while in some examples, obtaining the second angle from electronically stored information may include accessing the electronically stored information on the mobile device 115. In some examples, the electronically stored information may correspond to a building or other venue, and may be downloaded to the mobile device 115 upon entering or nearing the venue. In some examples, the common reference axis may correspond to a compass heading (e.g., a meridian passing through magnetic north). The operation(s) at block 1335 may be performed and/or managed using the navigation module 620 described with reference to FIGS. 6, 7, 8, 9, 10, and/or 11, and/or the second angle determination module 715 described with reference to FIGS. 7, 8, 9, and/or 10. An example of the operation(s) performed at block 1335 is described with reference to FIG. 4.

At block 1340, the method 1300 may include estimating a third angle, between the device reference axis and the common reference axis, based at least in part on the compass reading acquired at block 1315. The operation(s) at block 1340 may be performed and/or managed using the navigation module 620 described with reference to FIGS. 6, 7, 8, 9, 10, and/or 11, and/or the third angle estimation module 720 described with reference to FIGS. 7, 8, 9, and/or 10. An example of the operation(s) performed at block 1340 is described with reference to FIG. 5.

At block 1345 and block 1350, the method 1300 may include determining an orientation of the mobile device 115 based at least in part on the first angle, the second angle, and the third angle. More particularly, and at block 1345, the method 1300 may include determining, from at least the first angle and the second angle, a set of at least two possible orientations of the mobile device. When the at least one illuminated object includes a rectangular light fixture and the illuminated reference axis includes an edge of the rectangular light fixture, the set of at least two possible orientations of the mobile device may include two possible orientations of the mobile device. When the at least one illuminated object includes a square light fixture and the illuminated reference axis includes an edge of the square light fixture, the set of at least two possible orientations of the mobile device may include four possible orientations of the mobile device.

At block 1350, the method may include selecting the orientation of the mobile device, from the set of at least two possible orientations of the mobile device, based at least in part on the third angle. In this manner, the third angle (e.g., an angle based on a compass reading that may be somewhat imprecise because of the effects of magnetic influences inside a building or other structure) may be used to select a more precise orientation of the mobile device from a set of at least two possible orientations of the mobile device.

The operation(s) at block 1345 and/or block 1350 may be performed and/or managed using the navigation module 620 described with reference to FIGS. 6, 7, 8, 9, 10, and/or 11, and/or the orientation determination module 725 described with reference to FIGS. 7, 8, 9, and/or 10. An example of the operation(s) performed at block 1345 and/or block 1350 is described with reference to FIGS. 4 and/or 5.

Therefore, the method 1300 may be used for wireless communication. It should be noted that the method 1300 is just one implementation and that the operations of the method 1300 may be rearranged or otherwise modified such that other implementations are possible.

Figure 14:
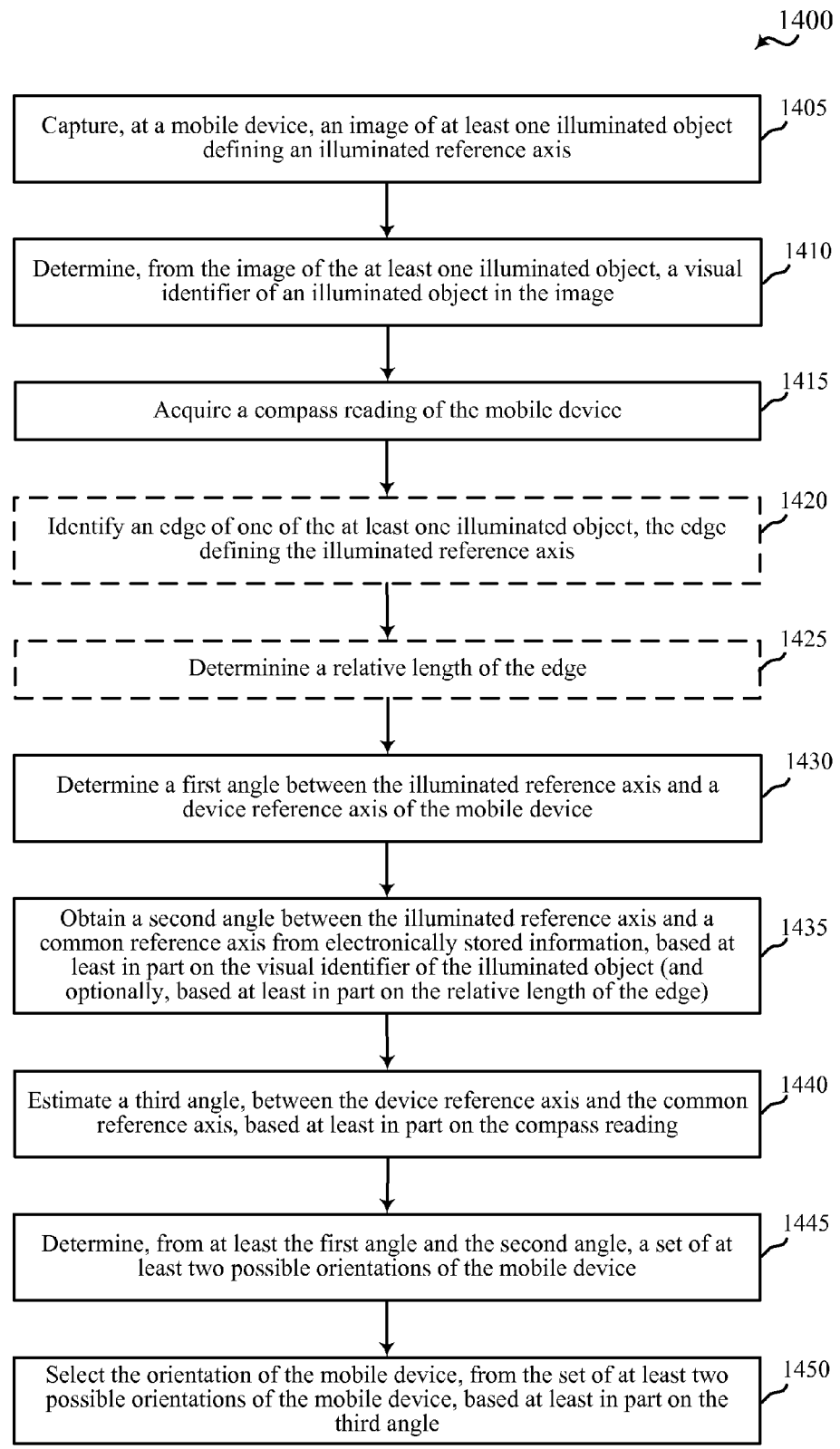
FIG. 14 is a flow chart illustrating a method for determining an orientation of a mobile device.

FIG. 14 is a flow chart illustrating a method 1400 for determining an orientation of a mobile device. For clarity, the method 1400 is described below with reference to aspects of one or more of the mobile devices 115 described with reference to FIGS. 1, 2, 3, 5, 6, 7, 8, 9, 10, and/or 11. In some examples, the navigation module 620 described with reference to FIGS. 6, 7, 8, 9, 10, and/or 11 may execute one or more sets of codes to control the functional elements of a mobile device 115 to perform the functions described below.

At block 1405, the method 1400 may include capturing, at a mobile device 115, an image of at least one illuminated object defining an illuminated reference axis. The mobile device 115 may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. The at least one illuminated object may in some cases be or include a light fixture, a light bulb, a light rope, and/or other form of illuminated object having a detectable orientation. In some examples, capturing the image of the at least one illuminated object may include capturing an image of at least part of at least one overhead light fixture. In some examples, the illuminated reference axis may be or include an illuminated edge of a polygonal light fixture or light bulb, an illuminated edge of a light fixture or light bulb having an illuminated edge, a line segment defined by a light rope, and/or a line segment defined by at least two illuminated points. The operation(s) at block 1405 may be performed and/or managed using the navigation module 620 described with reference to FIGS. 6, 7, 8, 9, 10, and/or 11, and/or the image capture module 705 described with reference to FIGS. 7, 8, 9, and/or 10. An example of the operation(s) performed at block 1405 is described with reference to FIG. 3.

At block 1410, the method 1400 may include determining, from the image of the at least one illuminated object, a visual identifier of an illuminated object in the image. The visual identifier may include a visually illuminated indicia on the illuminated object, such as a unique or quasi-unique pattern of light and dark elements, color, and/or pattern of colored elements. The operation(s) at block 1410 may be performed and/or managed using the navigation module 620 described with reference to FIGS. 6, 7, 8, 9, 10, and/or 11, and/or the object identification module 905 described with reference to FIG. 9.

At block 1415, the method 1400 may include acquiring a compass reading of the mobile device 115 (e.g., from a compass of the mobile device 115). The operation(s) at block 1415 may be performed and/or managed using the navigation module 620 described with reference to FIGS. 6, 7, 8, 9, 10, and/or 11, and/or the compass module 810 described with reference to FIG. 8. An example of the operation(s) performed at block 1415 is described with reference to FIG. 5.

Optionally, at block 1420, the method 1400 may include identifying an edge of one of the at least one illuminated object. The edge may define the illuminated reference axis. At block 1425, the method 1400 may include determining a relative length of the edge. In some examples, the relative length of the edge may be a length of the edge relative to another feature (e.g., another edge) of the at least one illuminated object in the image of the at least one illuminated object. In some examples, the determined relative length of the edge may include an indication of whether the edge is the long edge or the short edge of a rectangular light fixture. The operation(s) at block 1420 and/or block 1425 may be performed and/or managed using the navigation module 620 described with reference to FIGS. 6, 7, 8, 9, 10, and/or 11, and/or the edge analysis module 815 described with reference to FIGS. 8, 9, and/or 10. An example of the operation(s) performed at block 1420 and/or block 1425 is described with reference to FIG. 4.

At block 1430, the method 1400 may include determining a first angle, between the illuminated reference axis and a device reference axis of the mobile device 115. The device reference axis may in some cases correspond to a side of an image sensor (e.g., a side of an image sensor that captures the image of the at least one illuminated object), a side of a screen of the mobile device 115, or a side of the mobile device 115. The operation(s) at block 1430 may be performed and/or managed using the navigation module 620 described with reference to FIGS. 6, 7, 8, 9, 10, and/or 11, and/or the first angle determination module 710 described with reference to FIGS. 7, 8, 9, and/or 10. An example of the operation(s) performed at block 1430 is described with reference to FIG. 3.

At block 1435, the method 1400 may include determining a second angle, between the illuminated reference axis and a common reference axis, based at least in part on the visual identifier of the illuminated object determined at block 1410 (and optionally, based at least in part on the relative length of the edge identified at block 1420). For example, the visual identifier of the illuminated object may be used to retrieve, e.g., from electronically stored information, a second angle corresponding to the identified illuminated object. Optionally, the visual identifier of the illuminated object and the relative length of the edge may be used to retrieve, e.g., from electronically stored information, a second angle corresponding to both the visually identified illuminated object and the identified edge. In some examples, the electronically stored information may include an electronically stored map and/or database. In some examples, obtaining the second angle from electronically stored information may include accessing the electronically stored information over a network (e.g., a cellular network or a Wi-Fi network), while in some examples, obtaining the second angle from electronically stored information may include accessing the electronically stored information on the mobile device 115. In some examples, the electronically stored information may correspond to a building or other venue, and may be downloaded to the mobile device 115 upon entering or nearing the venue. In some examples, the common reference axis may correspond to a compass heading (e.g., a meridian passing through magnetic north). The operation(s) at block 1435 may be performed and/or managed using the navigation module 620 described with reference to FIGS. 6, 7, 8, 9, 10, and/or 11, and/or the second angle determination module 715 described with reference to FIGS. 7, 8, 9, and/or 10. An example of the operation(s) performed at block 1435 is described with reference to FIG. 4.

At block 1440, the method 1400 may include estimating a third angle, between the device reference axis and the common reference axis, based at least in part on the compass reading acquired at block 1415. The operation(s) at block 1440 may be performed and/or managed using the navigation module 620 described with reference to FIGS. 6, 7, 8, 9, 10, and/or 11, and/or the third angle estimation module 720 described with reference to FIGS. 7, 8, 9, and/or 10. An example of the operation(s) performed at block 1440 is described with reference to FIG. 5.

At block 1445 and block 1450, the method 1400 may include determining an orientation of the mobile device 115 based at least in part on the first angle, the second angle, and the third angle. More particularly, and at block 1445, the method 1400 may include determining, from at least the first angle and the second angle, a set of at least two possible orientations of the mobile device. When the at least one illuminated object includes a rectangular light fixture and the illuminated reference axis includes an edge of the rectangular light fixture, the set of at least two possible orientations of the mobile device may include two possible orientations of the mobile device. When the at least one illuminated object includes a square light fixture and the illuminated reference axis includes an edge of the square light fixture, the set of at least two possible orientations of the mobile device may include four possible orientations of the mobile device.

At block 1450, the method may include selecting the orientation of the mobile device, from the set of at least two possible orientations of the mobile device, based at least in part on the third angle. In this manner, the third angle (e.g., an angle based on a compass reading that may be somewhat imprecise because of the effects of magnetic influences inside a building or other structure) may be used to select a more precise orientation of the mobile device from a set of at least two possible orientations of the mobile device.

The operation(s) at block 1445 and/or block 1450 may be performed and/or managed using the navigation module 620 described with reference to FIGS. 6, 7, 8, 9, 10, and/or 11, and/or the orientation determination module 725 described with reference to FIGS. 7, 8, 9, and/or 10. An example of the operation(s) performed at block 1445 and/or block 1450 is described with reference to FIG. 5.

Therefore, the method 1400 may be used for wireless communication. It should be noted that the method 1400 is just one implementation and that the operations of the method 1400 may be rearranged or otherwise modified such that other implementations are possible.

Figure 15:
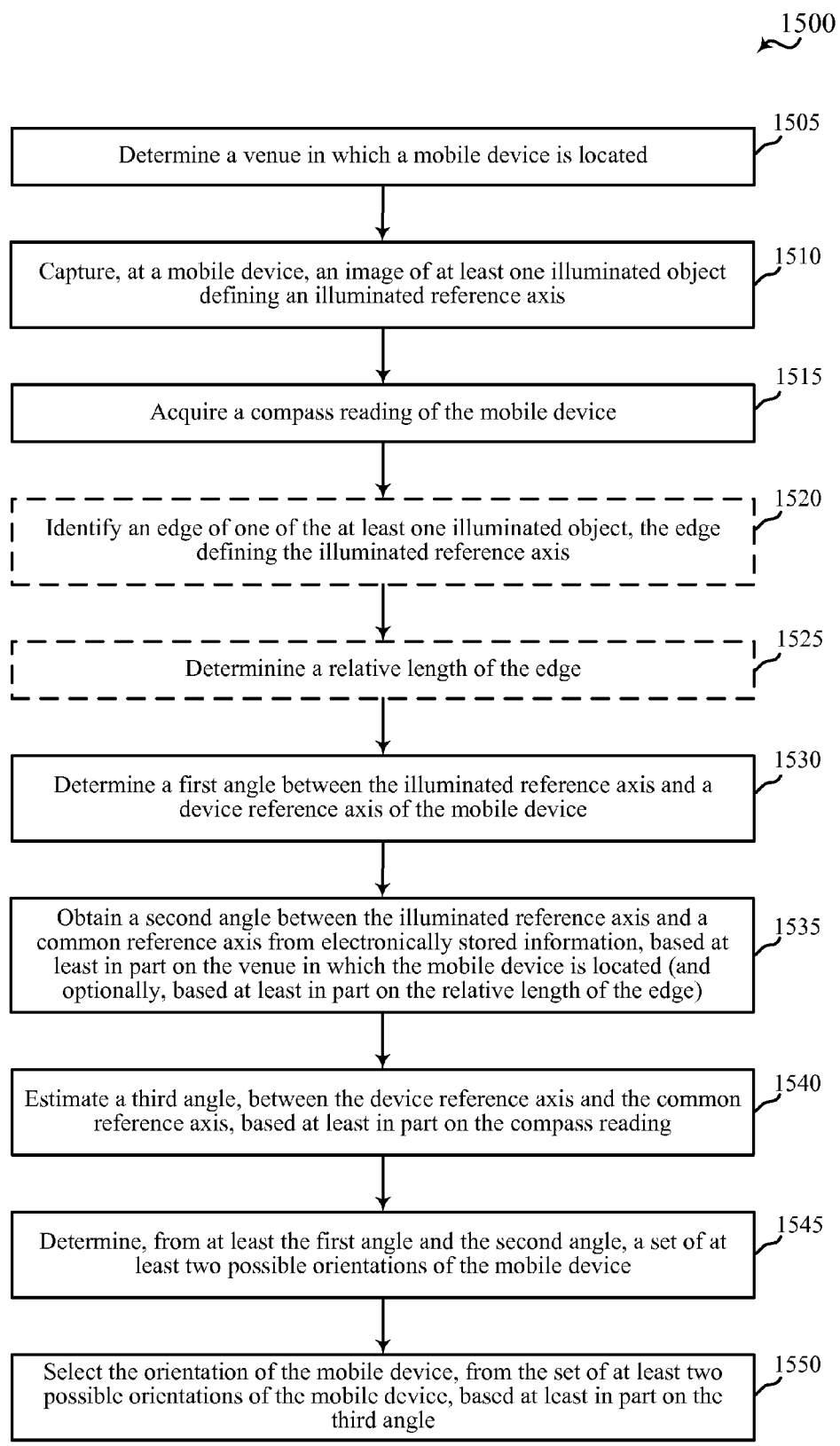
FIG. 15 is a flow chart illustrating a method for determining an orientation of a mobile device.

FIG. 15 is a flow chart illustrating a method 1500 for determining an orientation of a mobile device. For clarity, the method 1500 is described below with reference to aspects of one or more of the mobile devices 115 described with reference to FIGS. 1, 2, 3, 5, 6, 7, 8, 9, 10, and/or 11. In some examples, the navigation module 620 described with reference to FIGS. 6, 7, 8, 9, 10, and/or 11 may execute one or more sets of codes to control the functional elements of a mobile device 115 to perform the functions described below.

At block 1505, the method 1500 may include determining a venue in which a mobile device 115 is located (e.g., a building or other structure in which the mobile device 115 is located). In some examples, the venue may be determined based on global positioning system (GPS) signals or the identity of a Wi-Fi network accessible to the mobile device 115. The operation(s) at block 1505 may be performed and/or managed using the navigation module 620 described with reference to FIGS. 6, 7, 8, 9, 10, and/or 11, and/or the venue determination module 1005 described with reference to FIG. 10.

At block 1510, the method 1500 may include capturing, at a mobile device 115, an image of at least one illuminated object defining an illuminated reference axis. The mobile device 115 may in some cases be or include a cellular device (e.g., a smartphone), a computer (e.g., a tablet computer), a wearable device (e.g., a watch or electronic glasses), a module or assembly associated with a vehicle or robotic machine (e.g., a module or assembly associated with a forklift or vacuum cleaner), etc. The at least one illuminated object may in some cases be or include a light fixture, a light bulb, a light rope, and/or other form of illuminated object having a detectable orientation. In some examples, capturing the image of the at least one illuminated object may include capturing an image of at least part of at least one overhead light fixture. In some examples, the illuminated reference axis may be or include an illuminated edge of a polygonal light fixture or light bulb, an illuminated edge of a light fixture or light bulb having an illuminated edge, a line segment defined by a light rope, and/or a line segment defined by at least two illuminated points. The operation(s) at block 1510 may be performed and/or managed using the navigation module 620 described with reference to FIGS. 6, 7, 8, 9, 10, and/or 11, and/or the image capture module 705 described with reference to FIGS. 7, 8, 9, and/or 10. An example of the operation(s) performed at block 1510 is described with reference to FIG. 3.

At block 1515, the method 1500 may include acquiring a compass reading of the mobile device 115 (e.g., from a compass of the mobile device 115). The operation(s) at block 1515 may be performed and/or managed using the navigation module 620 described with reference to FIGS. 6, 7, 8, 9, 10, and/or 11, and/or the compass module 810 described with reference to FIG. 8. An example of the operation(s) performed at block 1515 is described with reference to FIG. 5.

Optionally, at block 1520, the method 1500 may include identifying an edge of one of the at least one illuminated object. The edge may define the illuminated reference axis. At block 1525, the method 1500 may include determining a relative length of the edge. In some examples, the relative length of the edge may be a length of the edge relative to another feature (e.g., another edge) of the at least one illuminated object in the image of the at least one illuminated object. In some examples, the determined relative length of the edge may include an indication of whether the edge is the long edge or the short edge of a rectangular light fixture. The operation(s) at block 1520 and/or block 1525 may be performed and/or managed using the navigation module 620 described with reference to FIGS. 6, 7, 8, 9, 10, and/or 11, and/or the edge analysis module 815 described with reference to FIGS. 8, 9, and/or 10. An example of the operation(s) performed at block 1515 and/or block 1520 is described with reference to FIG. 4.

At block 1530, the method 1500 may include determining a first angle, between the illuminated reference axis and a device reference axis of the mobile device 115. The device reference axis may in some cases correspond to a side of an image sensor (e.g., a side of an image sensor that captures the image of the at least one illuminated object), a side of a screen of the mobile device 115, or a side of the mobile device 115. The operation(s) at block 1530 may be performed and/or managed using the navigation module 620 described with reference to FIGS. 6, 7, 8, 9, 10, and/or 11, and/or the first angle determination module 710 described with reference to FIGS. 7, 8, 9, and/or 10. An example of the operation(s) performed at block 1530 is described with reference to FIG. 3.

At block 1535, the method 1500 may include determining a second angle, between the illuminated reference axis and a common reference axis, based at least in part on the venue of the mobile device 115 determined at block 1505 (and optionally, based at least in part on the relative length of the edge identified at block 1520). For example, the venue of the mobile device 115 may be used to retrieve, e.g., from electronically stored information, a second angle corresponding to the at least one illuminated object. Optionally, the venue of the mobile device 115 and the relative length of the edge may be used to retrieve, e.g., from electronically stored information, a second angle corresponding to both the identified at least one illuminated object and the identified edge. In some examples, the electronically stored information may include an electronically stored map and/or database. In some examples, obtaining the second angle from electronically stored information may include accessing the electronically stored information over a network (e.g., a cellular network or a Wi-Fi network), while in some examples, obtaining the second angle from electronically stored information may include accessing the electronically stored information on the mobile device 115. In some examples, the electronically stored information may correspond to a building or other venue, and may be downloaded to the mobile device 115 upon entering or nearing the venue. In some examples, the common reference axis may correspond to a compass heading (e.g., a meridian passing through magnetic north). The operation(s) at block 1535 may be performed and/or managed using the navigation module 620 described with reference to FIGS. 6, 7, 8, 9, 10, and/or 11, and/or the second angle determination module 715 described with reference to FIGS. 7, 8, 9, and/or 10. An example of the operation(s) performed at block 1535 is described with reference to FIG. 4.

At block 1540, the method 1500 may include estimating a third angle, between the device reference axis and the common reference axis, based at least in part on the compass reading acquired at block 1515. The operation(s) at block 1540 may be performed and/or managed using the navigation module 620 described with reference to FIGS. 6, 7, 8, 9, 10, and/or 11, and/or the third angle estimation module 720 described with reference to FIGS. 7, 8, 9, and/or 10. An example of the operation(s) performed at block 1540 is described with reference to FIG. 5.

At block 1545 and block 1550, the method 1500 may include determining an orientation of the mobile device 115 based at least in part on the first angle, the second angle, and the third angle. More particularly, and at block 1545, the method 1500 may include determining, from at least the first angle and the second angle, a set of at least two possible orientations of the mobile device. When the at least one illuminated object includes a rectangular light fixture and the illuminated reference axis includes an edge of the rectangular light fixture, the set of at least two possible orientations of the mobile device may include two possible orientations of the mobile device. When the at least one illuminated object includes a square light fixture and the illuminated reference axis includes an edge of the square light fixture, the set of at least two possible orientations of the mobile device may include four possible orientations of the mobile device.

At block 1550, the method may include selecting the orientation of the mobile device, from the set of at least two possible orientations of the mobile device, based at least in part on the third angle. In this manner, the third angle (e.g., an angle based on a compass reading that may be somewhat imprecise because of the effects of magnetic influences inside a building or other structure) may be used to select a more precise orientation of the mobile device from a set of at least two possible orientations of the mobile device.

The operation(s) at block 1545 and/or block 1550 may be performed and/or managed using the navigation module 620 described with reference to FIGS. 6, 7, 8, 9, 10, and/or 11, and/or the orientation determination module 725 described with reference to FIGS. 7, 8, 9, and/or 10. An example of the operation(s) performed at block 1545 and/or block 1550 is described with reference to FIG. 5.

Therefore, the method 1500 may be used for wireless communication. It should be noted that the method 1500 is just one implementation and that the operations of the method 1500 may be rearranged or otherwise modified such that other implementations are possible.

In some examples, aspects of the methods 1200, 1300, 1400, and/or 1500 may be combined.

Techniques described herein may be used to determine the orientations of mobile devices operating in various wireless communication systems, such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may, individually or collectively, be implemented or performed with one or more application-specific integrated circuits (ASICs) adapted to perform some or all of the applicable functions in hardware. Alternatively, the functions may be performed by one or more other processing units (or cores) such as a general-purpose processor or a digital signal processor (DSP), and/or on one or more integrated circuits. A general-purpose processor may be a microprocessor, any conventional processor, controller, microcontroller, state machine, or combination thereof. A processor may also be implemented as a combination of computing devices, e.g., a combination of a DSP and a microprocessor, multiple microprocessors, one or more microprocessors in conjunction with a DSP core, or any other such configuration. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each of the blocks and modules may also be implemented, in whole or in part, with instructions embodied in a memory, formatted to be executed by one or more general or application-specific processors.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The detailed description set forth above in connection with the appended drawings is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments. Thus, the disclosure is not to be limited to the examples and designs described herein but is to be accorded the widest scope consistent with the principles and novel features disclosed herein.

What is claimed is:

1. A method for determining an orientation of a mobile device, comprising:
   capturing, at the mobile device, an image of at least one illuminated object defining an illuminated reference axis;
   determining a first angle between the illuminated reference axis and a device reference axis of the mobile device;
   determining a second angle between the illuminated reference axis and a common reference axis;
   estimating a third angle between the device reference axis and the common reference axis; and
   determining the orientation of the mobile device based at least in part on the first angle, the second angle, and the third angle.

2. The method of claim 1, wherein capturing the image of the at least one illuminated object comprises:
   capturing an image of at least part of at least one overhead light fixture.

3. The method of claim 2, wherein the illuminated reference axis comprises:
   an edge of one of the at least one overhead light fixture.

4. The method of claim 1, further comprising:
   receiving a visible light communication (VLC) signal comprising an identifier of an illuminated object in the image;
   wherein determining the second angle comprises obtaining the second angle from electronically stored information based at least in part on the identifier of the illuminated object.

5. The method of claim 1, further comprising:
   determining, from the image of the at least one illuminated object, a visual identifier of an illuminated object in the image;
   wherein determining the second angle comprises obtaining the second angle from electronically stored information based at least in part on the visual identifier of the illuminated object.

6. The method of claim 1, further comprising:
   determining a venue in which the mobile device is located;
   wherein determining the second angle comprises obtaining the second angle from electronically stored information based at least in part on the venue in which the mobile device is located.

7. The method of claim 1, further comprising:
   identifying an edge of one of the at least one illuminated object, the edge including the illuminated reference axis; and
   determining a relative length of the edge;
   wherein determining the second angle comprises determining the second angle based at least in part on the relative length of the edge.

8. The method of claim 1, wherein determining the second angle comprises:
   obtaining the second angle from electronically stored information.

9. The method of claim 8, wherein obtaining the second angle from the electronically stored information comprises:

accessing the electronically stored information over a network.

10. The method of claim 1, wherein the common reference axis corresponds to a compass heading, the method further comprising:
acquiring a compass reading of the mobile device;
wherein estimating the third angle comprises estimating the third angle based at least in part on the compass reading.

11. The method of claim 10, wherein the compass heading is magnetic north.

12. The method of claim 1, wherein determining the orientation of the mobile device comprises:
determining, from at least the first angle and the second angle, a set of at least two possible orientations of the mobile device; and
selecting the orientation of the mobile device, from the set of at least two possible orientations of the mobile device, based at least in part on the third angle.

13. The method of claim 1, wherein the illuminated reference axis comprises:
an illuminated edge of a polygonal light fixture.

14. The method of claim 1, wherein the illuminated reference axis comprises:
a line segment defined by a light rope.

15. The method of claim 1, wherein the illuminated reference axis comprises:
a line segment defined by at least two illuminated points.

16. An apparatus for determining an orientation of a mobile device, comprising:
means for capturing, at the mobile device, an image of at least one illuminated object defining an illuminated reference axis;
means for determining a first angle between the illuminated reference axis and a device reference axis of the mobile device;
means for determining a second angle between the illuminated reference axis and a common reference axis;
means for estimating a third angle between the device reference axis and the common reference axis; and
means for determining the orientation of the mobile device based at least in part on the first angle, the second angle, and the third angle.

17. The apparatus of claim 16, wherein the means for capturing the image of the at least one illuminated object comprises:
means for capturing an image of at least part of at least one overhead light fixture.

18. The apparatus of claim 17, wherein the illuminated reference axis comprises:
an edge of one of the at least one overhead light fixture.

19. The apparatus of claim 16, further comprising:
means for receiving a visible light communication (VLC) signal comprising an identifier of an illuminated object in the image;
wherein the means for determining the second angle comprises means for obtaining the second angle from electronically stored information based at least in part on the identifier of the illuminated object.

20. The apparatus of claim 16, further comprising:
means for determining, from the image of the at least one illuminated object, a visual identifier of an illuminated object in the image;
wherein the means for determining the second angle comprises means for obtaining the second angle from electronically stored information based at least in part on the visual identifier of the illuminated object.

21. The apparatus of claim 16, further comprising:
means for determining a venue in which the mobile device is located;
wherein the means for determining the second angle comprises means for obtaining the second angle from electronically stored information based at least in part on the venue in which the mobile device is located.

22. The apparatus of claim 16, further comprising:
means for identifying an edge of one of the at least one illuminated object, the edge including the illuminated reference axis; and
means for determining a relative length of the edge;
wherein the means for determining the second angle comprises means for determining the second angle based at least in part on the relative length of the edge.

23. The apparatus of claim 16, wherein the common reference axis corresponds to a compass heading, the apparatus further comprising:
means for acquiring a compass reading of the mobile device;
wherein the means for estimating the third angle comprises means for estimating the third angle based at least in part on the compass reading.

24. The apparatus of claim 16, wherein the means for determining the orientation of the mobile device comprises:
means for determining, from at least the first angle and the second angle, a set of at least two possible orientations of the mobile device; and
means for selecting the orientation of the mobile device, from the set of at least two possible orientations of the mobile device, based at least in part on the third angle.

25. An apparatus for determining an orientation of a mobile device, comprising:
a processor;
memory in electronic communication with the processor; and
instructions stored in the memory, the instructions being executable by the processor to:
capture, at a mobile device, an image of at least one illuminated object defining an illuminated reference axis;
determine a first angle between the illuminated reference axis and a device reference axis of the mobile device;
determine a second angle between the illuminated reference axis and a common reference axis;
estimate a third angle between the device reference axis and the common reference axis; and
determine the orientation of the mobile device based at least in part on the first angle, the second angle, and the third angle.

26. The apparatus of claim 25, wherein the instructions are executable by the processor to:
identify an edge of one of the at least one illuminated object, the edge including the illuminated reference axis; and
determine a relative length of the edge;
wherein the instructions executable by the processor to determine the second angle comprise instructions executable by the processor to determine the second angle based at least in part on the relative length of the edge.

27. The apparatus of claim 25, wherein the common reference axis corresponds to a compass heading, and wherein the instructions are executable by the processor to:
acquire a compass reading of the mobile device;
wherein the instructions executable by the processor to estimate the third angle comprise instructions executable by the processor to estimate the third angle based at least in part on the compass reading.

28. The apparatus of claim 25, wherein the instructions executable by the processor to determine the orientation of the mobile device comprise instructions executable by the processor to:
   determine, from at least the first angle and the second angle, a set of at least two possible orientations of the mobile device; and
   select the orientation of the mobile device, from the set of at least two possible orientations of the mobile device, based at least in part on the third angle.

29. A computer program product for determining an orientation of a mobile device, the computer program product comprising a non-transitory computer-readable medium storing instructions executable by a processor to cause the mobile device to:
   capture, at a mobile device, an image of at least one illuminated object defining an illuminated reference axis;
   determine a first angle between the illuminated reference axis and a device reference axis of the mobile device;
   determine a second angle between the illuminated reference axis and a common reference axis;
   estimate a third angle between the device reference axis and the common reference axis; and
   determine the orientation of the mobile device based at least in part on the first angle, the second angle, and the third angle.

30. The computer program product of claim 29, wherein the common reference axis corresponds to a compass heading, and wherein the instructions are executable by the processor to cause the mobile device to:
   acquire a compass reading of the mobile device;
   wherein the instructions executable by the processor to estimate the third angle comprise instructions executable by the processor to estimate the third angle based at least in part on the compass reading.

* * * * *